US012003281B1

(12) United States Patent
Huang

(10) Patent No.: US 12,003,281 B1
(45) Date of Patent: Jun. 4, 2024

(54) RADIO FREQUENCY DOMAIN CALIBRATION SYSTEM AND METHOD FOR RADIO FREQUENCY CIRCUIT UNITS

(71) Applicant: SOUTHEAST UNIVERSITY, Nanjing (CN)

(72) Inventor: Fengyi Huang, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 18/565,533

(22) PCT Filed: Dec. 5, 2022

(86) PCT No.: PCT/CN2022/136570
§ 371 (c)(1),
(2) Date: Nov. 30, 2023

(87) PCT Pub. No.: WO2023/185070
PCT Pub. Date: Oct. 5, 2023

(30) Foreign Application Priority Data

Mar. 28, 2022 (CN) .......................... 202210310816.9

(51) Int. Cl.
H04B 17/00 (2015.01)
H04B 1/04 (2006.01)
(Continued)

(52) U.S. Cl.
CPC ........... H04B 17/14 (2015.01); H04B 1/0475 (2013.01); H04B 17/21 (2015.01)

(58) Field of Classification Search
CPC ....... H04B 17/14; H04B 1/0475; H04B 17/21
See application file for complete search history.

(56) References Cited

U.S. PATENT DOCUMENTS

2018/0092048 A1* 3/2018 Cheng .................... H04B 17/13
2021/0083782 A1* 3/2021 Jones .................... H03L 7/0891

FOREIGN PATENT DOCUMENTS

CN 101313475 A 11/2008
CN 102970053 A 3/2013
(Continued)

OTHER PUBLICATIONS

Yan Renhui, et al., The RF power calibration system is developed based on the GPIB interface of NAT9914, Fujian Computer, 2012, pp. 125-127.
(Continued)

Primary Examiner — Ping Y Hsieh
(74) Attorney, Agent, or Firm — Bayramoglu Law Offices LLC

(57) ABSTRACT

A radio frequency domain calibration system and method for radio frequency circuit units is provided. The system regulates and calibrates radio frequency integrated circuit devices, circuit modules and transceiver circuit systems including circuit components in the radio frequency domain through calibration units. The calibration unit includes a calibration control unit and a calibration regulation unit, where the calibration control unit generates a calibration control signal, and drives the calibration regulation unit to perform programmable, adaptive, and real-time regulation on the circuit structure, geometric scale, and working parameters of the radio frequency circuit unit, so that the radio frequency circuit unit works in a desired condition with optimized performances. Compared with existing digital domain calibration systems, the radio frequency domain calibration system has smaller chip area, lower cost, and higher regulation flexibility and module configuration flexibility.

20 Claims, 10 Drawing Sheets

(51) Int. Cl.
  *H04B 17/14* (2015.01)
  *H04B 17/21* (2015.01)

(56) References Cited

FOREIGN PATENT DOCUMENTS

| | | | |
|---|---|---|---|
| CN | 104539377 | * | 4/2015 |
| CN | 104539377 | A | 4/2015 |
| CN | 107888151 | A | 4/2018 |
| CN | 109444824 | A | 3/2019 |
| CN | 109462446 | A | 3/2019 |
| CN | 110958062 | A | 4/2020 |
| CN | 112543157 | A | 3/2021 |
| CN | 114422044 | A | 4/2022 |

OTHER PUBLICATIONS

David J. McLaurin, et al., A Highly Reconfigurable 65nm CMOS RF-to-Bits Transceiver for Full-Band Multicarrier TDD/FDD 2G/3G/4G/5G Macro Basestations, 2018 IEEE International Solid-State Circuits Conference, 2018, pp. 162-163.

* cited by examiner

RADIO FREQUENCY DOMAIN CALIBRATION SYSTEM AND METHOD FOR RADIO FREQUENCY CIRCUIT UNITS

CROSS REFERENCE TO THE RELATED APPLICATIONS

This application is the national phase entry of International Application No. PCT/CN2022/136570, filed on Dec. 5, 2022, which is based upon and claims priority to Chinese Patent Application No. 202210310816.9, filed on Mar. 28, 2022, the entire contents of which are incorporated herein by reference.

TECHNICAL FIELD

The present invention belongs to the field of electronic science and technology, and relates to a radio frequency domain calibration system and method for radio frequency integrated circuit devices and transceivers.

BACKGROUND

As integrated functions become increasingly complex, radio frequency transceiver circuit systems (or referred to as radio frequency transceivers) need to be switched in real time between different functions, modes, protocols, wide frequency bands, and channel bandwidths. Radio frequency devices, modules, and systems including circuit components are referred to as radio frequency circuit units or simply as circuit units. Deviations in device models, design simulations, manufacturing processes, and differences or fluctuations in working conditions, as well as aging of devices and circuits caused by long-time use may make the circuit units incapable of working in the desired optimal conditions or states, resulting in distortion and mismatch problems. To ensure that the circuits work in the desired conditions under different modes and conditions with better performances, real-time regulation and calibration on structures and parameters of radio frequency circuit units and performance optimization have become a key technology in the field of radio frequency integrated circuit chip design. A calibration circuit unit for regulating and calibrating a functional working circuit unit is referred to as a calibration unit.

Reference "D. J. McLaurin et al. A highly reconfigurable 65 nm CMOS RF-to-bits transceiver for full-band multicarrier TDD/FDD 2G/3G/4G/5G macro basestation", 2018 IEEE International Solid-State Circuits Conference (ISSCC), 2018, pp. 162-164 (doi: 10.1109/ISSCC.2018.8310234, Reference 1) employs a digital domain calibration method, integrates calibration algorithms such as quadrature error correction (QEC), direct current (DC) offset correction, and digital pre-distortion correction in a digital calibration circuit, and implements calibration of received/transmitted signals in the digital domain. The digital calibration algorithms are mainly suitable for wireless mobile communication transceiver circuits, and may not be suitable for other circuit systems with different functions or structures. Moreover, due to the integration of mass algorithms, the layout area of a digital logic circuit is close to a half of that of a single-channel transceiver chip, which increases chip costs.

The invention patent "Amplifier calibration" (CN201710859254.2, 2017 Sep. 21, reference patent 1) discloses a calibration technology for an operational amplifier. In response to the deterioration of parameters such as common mode rejection ratio and gain faced by a fabricated operational amplifier, component parameters (such as a resistor network) at the input end of the operational amplifier are configured based on amplifier test results, so as to calibrate the operational amplifier. The calibration technology requires manual configuration on the component parameters of the operational amplifier circuit and does not have software controlled automatic calibration functions. Moreover, the technology is only applicable to operational amplifiers and cannot perform radio frequency domain calibration for other circuit units.

The invention patent "Digital pre-distortion (DPD) in a wireless transmitter" (US201916578085, 2019 Sep. 20, reference patent 2) discloses a digital domain pre-distortion calibration technology (abbreviated as digital pre-distortion) for implementing a wireless transmitter (or a transmitting chain) by detecting output power. The technology first converts received transmission signals into digital signals through ADC, and relies on a digital pre-distortion calibration (or correction) algorithm in a digital logic circuit. The technology does not have a pre-distortion function in the radio frequency domain.

The invention patent "Phase or delay control in multi-channel RF applications" (CN201811030821.4, 2018 Sep. 5, reference patent 3) discloses a method for generating multi-channel local oscillator signals with different phases or delays. The technology cannot implement real-time calibration on amplitude, phase, noise, jitter, and delay of local oscillator signals.

The invention patent "Wireless sensor network application-oriented low-power consumption radio frequency transceiver" (CN201210548579.6, 2012 Dec. 17, reference patent 4) discloses a low-power transceiver, where an automatic frequency tuning circuit is configured to control the frequency characteristics of a filter, so as to reduce the impact of process errors on center frequency and bandwidth. The technology can improve only the consistency and reliability of the filter with a single and fixed center frequency and bandwidth. Once the transceiver circuit is solidified, it can neither regulate and calibrate the circuit structure and working parameters of the filter in real time and adaptively for different operating conditions, nor optimize the overall performance of the filter (such as frequency and bandwidth) in real time.

The invention patent "Programmable radio transceiver" (200680037710, 2006 Aug. 11, reference patent 5) discloses a programmable transceiver using a transmission line inductor to achieve switching between different frequency bands and different protocols. However, the transceiver cannot achieve real-time calibration and optimization on performance parameters of a circuit unit (such as bandwidth, gain, noise figure, output power, efficiency, linearity, error vector magnitude EVM, adjacent channel suppression, interference suppression, attenuation accuracy, phase shifting accuracy, and matching) by regulating the circuit structure, geometric scale, and circuit working parameters.

To sum up, a feasible technology lacks for adaptive real-time regulation and calibration on the structure, geometric scale, and working parameters of a radio frequency circuit unit, to operate in desired conditions under different modes and conditions and achieve performance optimization. Existing technologies cannot achieve real-time programmable and configurable automatic calibration and performance optimization on a radio frequency circuit unit in the radio frequency domain. The conventional digital calibration method for a radio frequency transceiver circuit system (including a receiving chain and a transmitting chain) implements calibration on a transceiver by using digital calibration algorithms programmed in a digital logic circuit (abbreviated as digital calibration). The calibration method relies on digital logic circuits with complex computing capabilities, such as a baseband circuit, a microcontrol unit (MCU), or an ASIC circuit for special applications, which increase chip area and costs. Moreover, the digital calibration method is usually only applicable to a specific mode or structural type of transceiver circuit system or circuit module, and has poor flexibility and universality for different applications. In addition, for the receiving chain (or receiver), before digital calibration, received signals are converted into digital signals by an analog-to-digital signal converter (ADC), and then the receiving chain is calibrated in the digital domain, thereby reducing the flexibility of configuring different circuit modules in the transceiver. The conventional calibration methods for some radio frequency devices (such as a frequency synthesizer and a filter) rely on special circuit structures. Once a circuit is solidified, the circuit structure and working parameters cannot be automatically regulated in real time through software control. The conventional calibration methods for operational amplifiers requires manual configuration. The present invention provides a radio frequency domain calibration system and method, where it is not necessary to convert analog signals into digital signals by ADC, while corresponding calibration units are configured in the radio frequency domain for circuit components, devices, modules and transceivers; and programmable, configurable, adaptive, real-time regulation and calibration are implemented in the radio frequency domain for circuit units of different types (communication, radar, navigation, electronic countermeasures, and the like), modes or protocols by regulating the circuit structure, geometric scale, and working parameters of the circuit units and the working parameters of input/output nodes, so that the circuit units may work in desired conditions with optimized performances.

SUMMARY

In response to the shortcomings of the existing technologies, the present invention aims to provide a calibration system and method for radio frequency circuit units in the radio frequency domain (also known as the analog domain in a broad sense), where programmable, configurable, adaptive, real-time regulation and calibration are implemented in the radio frequency domain for radio frequency circuit units of different types, working conditions, structures, or modes, by regulating circuit structures, geometric scales, and working parameters of the circuit units and working parameters of input/output nodes through calibration units, so that the circuit units may work in desired conditions with optimized performances. Compared with conventional digital domain calibration methods, radio frequency circuits or analog circuits implemented based on the radio frequency domain (or analog domain) real-time and adaptive programmable calibration technology (RF-domain Agile Programmable Calibration, RAPC) of the present invention are applicable to different types of systems such as communication, radar, navigation, tracking, and the like, and are also applicable to radio frequency integrated circuits (RFIC, including frequency mixing or phase shifting system structures, time division duplex TDD, frequency division duplex FDD, full duplex FD, and the like), optoelectronic integrated circuits (OEIC), and digital radio (digital RF) integrated circuits.

In order to achieve the above objectives, the technical solution of the present invention is as follows: A radio frequency domain calibration system for radio frequency circuit units includes a calibration unit and a radio frequency circuit unit;

the radio frequency circuit unit includes one or more of radio frequency devices, or circuit modules, or transceiver circuit systems consisting of circuit components;

the calibration unit includes a calibration control unit and a calibration regulation unit;

the calibration control unit includes a memory, an arithmetic unit, a logic control unit, and a bus;

the memory is configured to store calibration instructions;

the arithmetic unit is configured for data operation in the calibration control unit;

the logic control unit is configured to extract the instructions from the memory, decode the instructions, and send corresponding control signals;

the bus is configured to connect the arithmetic unit, the memory, and the logic control unit, so as to implement information transfer and interaction among the arithmetic unit, the memory, and the logic control unit;

the calibration control unit generates calibration control signals to drive and regulate the calibration regulation unit;

the calibration control units of some or all of the radio frequency circuit units are integrated together;

the calibration regulation unit includes switches or switch array networks, and one of or a combination of tuning networks, resistors networks, transmission line networks, and transformer networks;

component parameters of the inductors, capacitors, resistors, transmission lines, and transformers of the calibration regulation unit are discrete or continuously variable values;

the calibration regulation unit regulates the structure, geometric scale, and working parameters of the radio frequency circuit unit and working parameters of input/output nodes through the switch or switch array network; and the calibration control unit is implemented by a silicon-based semiconductor process, and the radio frequency circuit unit and the calibration regulation unit are implemented by the silicon-based semiconductor process or a compound semiconductor process; circuits of the same process are integrated by a single chip, and circuits of different processes are integrated by a system-level package.

As an improvement of the present invention, the calibration system further includes an MCU for radio frequency domain calibration; and the calibration control units of the radio frequency circuit units are integrated into the MCU for radio frequency domain calibration to implement programmable and real-time regulation and calibration of the circuit units.

As a preferred solution of the present invention, the radio frequency transceiver circuit system (abbreviated as a transceiver) or circuit module regulated and calibrated by the calibration unit includes a single channel or multiple channels, has a frequency mixing structure, a phase shifting structure, or a combination of the two, and works in one of or a combination of communication, radar, navigation, tracking, imaging, measurement, and electronic countermeasure modes, and its working frequency covers radio frequency bands, microwave or millimeter wave frequency bands, terahertz frequency band, or a combination of different frequency bands above.

As a preferred solution of the present invention, circuit devices or circuit modules regulated and calibrated by the calibration units in the radio frequency domain in the frequency mixing transceiver (abbreviated as a transceiver) or circuit module include:
- in a receiving chain (receiver) of the frequency mixing transceiver, after an antenna receives signals and before an ADC, the circuit devices include, but are not limited to, a low noise amplifier (LNA), a down-mixer, a receiver (Rx) frequency synthesizer (FS), a receiver (Rx) programmable gain amplifier (PGA), and a receiver filter (Rx Filter) in order of connection, where the receiver frequency synthesizer is connected to the down-mixer to provide local oscillator signals for the receiving chain; and
- in a transmitting chain (transmitter) of the frequency mixing transceiver, after a DAC and before the antenna transmits signals, the circuit devices include, but are not limited to, a transmitter filter (Tx Filter), a transmitter (Tx) programmable gain amplifier (PGA), a transmitter (Tx) frequency synthesizer (FS), an up-mixer, and a power amplifier (PA) or driver amplifier (DA) in order of connection, where the transmitter frequency synthesizer is connected to the up-mixer to provide local oscillator signals for the transmitting chain;
- where the calibration regulation units for the low noise amplifier, the mixers (including the down-mixer and the up-mixer), and the power amplifier or driver amplifier each include a bias regulation subunit, an amplitude regulation subunit, and a phase regulation subunit;
- the calibration regulation units for the programmable gain amplifiers, the filters (including the receiver filter and the transmitter filter), and the operational amplifier each include a bias regulation subunit, an amplitude regulation subunit, a phase regulation subunit, and a DC offset cancellation subunit;
- the calibration regulation units for the frequency synthesizers each include an amplitude regulation subunit and a phase regulation subunit;
- the receiver frequency synthesizer and the transmitter frequency synthesizer can be shared for transceivers of time division duplex (TDD) and full duplex (FD), and other types;
- the frequency mixing transceiver includes one or more channels; and
- the calibration units control the calibration regulation units of the circuit units in each channel to regulate, calibrate, and optimize performance parameters (such as carrier frequency, bandwidth, gain, noise figure, output power, efficiency, linearity, error vector amplitude EVM, adjacent channel suppression, interference suppression, and matching) of the circuit units.

As a preferred solution of the present invention, circuit devices or circuit modules regulated and calibrated by the calibration units in the radio frequency domain in the phase shifting transceiver or circuit module include:
- in a receiving chain of the phase shifting transceiver, after an antenna receives signals, the circuit devices regulated and calibrated by the calibration units include, but are not limited to, a low noise amplifier, a receiver phase shifter, a receiver attenuator, and a power synthesizer in order of connection; and
- in a transmitting chain of the phase shifting transceiver, after a power distributor performs power distribution on input signals and before the antenna transmits signals, the circuit devices regulated and calibrated by the calibration units include, but are not limited to, a transmitter attenuator, a transmitter phase shifter, and a power amplifier or driver amplifier in order of connection;
- where the calibration regulation units for the phase shifters each include a bias regulation subunit and a phase regulation subunit;
- the calibration regulation units for the attenuators each include a bias regulation subunit and an amplitude regulation subunit;
- the calibration regulation units for the power synthesizer and the power distributor each include a transmission line regulation subunit;
- the phase shifting transceiver includes one or more channels; and
- the calibration units control the calibration regulation units of the circuit units in each channel to regulate, calibrate, and optimize performance parameters (such as phase shifting accuracy, attenuation accuracy, gain, linearity, noise figure, working frequency range, input matching, output matching, insertion loss, and isolation) of the circuit units.

As a preferred solution of the present invention, the calibration system includes a reconfigurable transceiver or circuit module, a reconfigurable regulation circuit, and a calibration unit;
- the reconfigurable regulation circuit is connected to reconfigurable circuit devices or modules (such as a frequency synthesizer, a low noise amplifier, a power amplifier, a mixer, and a filter);
- the reconfigurable regulation circuit includes switches or switch array networks, and one of or a combination of tuning networks, resistor networks, transmission line networks, and transformer networks;
- in the tuning network and the resistor network of the reconfigurable regulation circuit, component parameters of the inductors, capacitors, resistors, transmission lines, and transformers are discrete or continuously variable values to achieve discrete or continuous regulation on performance parameters such as carrier frequency range and channel bandwidth; and
- the calibration control unit controls the calibration regulation unit, so that the reconfigurable transceiver or circuit module works in a desired condition or state (such as mode, frequency band, channel bandwidth, and protocol), and performs real-time switching and performance optimization.

As an improvement of the present invention, the radio frequency domain calibration system further includes a feedback circuit unit;
- the feedback circuit unit includes a calibration observation receiver, a signal detection unit, and a signal transmission unit;
- the calibration observation receiver includes but is not limited to, from receiving input signals, one or more circuit devices of a low noise amplifier, a down-mixer, a receiver frequency synthesizer, a receiver programmable gain amplifier, and a receiver filter in order of connection, or re-use the receiving chain of a transceiver circuit system;
- the calibration observation receiver is configured to receive signals output from the radio frequency circuit units;
- the signal detection unit is configured to classify, extract, amplify, and quantify the signals received by the calibration observation receiver, and detect useful signals; and the signal transmission unit is configured to transmit the useful signals detected out by the signal detection unit to the calibration control unit.

As an improvement of the present invention, the feedback circuit unit is configured for radio frequency domain pre-distortion calibration of the transmitting chain in the transceiver circuit system.

As an improvement of the present invention, the radio frequency domain calibration system further includes a radio frequency domain and digital domain joint calibration circuit;
- the radio frequency domain and digital domain joint calibration circuit includes a radio frequency domain calibration unit and circuit unit, an MCU for digital domain calibration, an ADC/DAC, a digital calibration algorithm circuit, a data interface circuit, and a baseband circuit;
- the digital calibration algorithm circuit is configured to implement a digital calibration algorithm program;
- the digital calibration algorithm program includes an orthogonal error correction (or calibration) algorithm, a DC offset correction algorithm, an IQ path mismatch correction algorithm, a local oscillator leakage correction algorithm, an image rejection correction algorithm, and a digital pre-distortion correction algorithm;
- the MCU for digital domain calibration runs the digital calibration control program to control the digital calibration algorithm circuit, the data interface circuit, and the baseband circuit;
- the data interface circuit (such as high-speed Serdes interface) is configured for information interaction between the digital calibration algorithm circuit and the baseband circuit; and
- the baseband circuit is configured to process digital baseband signals.

A calibration method for the foregoing radio frequency domain calibration system for radio frequency circuit units regulates and calibrates circuit structures, geometric scales, and working parameters of the radio frequency circuit units in real time through the calibration unit in the radio frequency domain; including the following steps:
- step 1: externally inputting or internally generating a calibration instruction;
- step 2: receiving and storing, by the memory in the calibration control unit, the calibration instruction;
- step 3-1: fetching, by the logic control unit in the calibration control unit, the calibration instruction from the memory;
- step 3-2: performing, by the arithmetic unit in the calibration control unit, data operation according to the calibration instruction;
- step 3-3: transmitting data generated by the arithmetic unit after operation to the logic control unit by the bus for decoding;
- step 3-4: outputting, by the logic control unit, a calibration control signal to drive and regulate the calibration regulation unit; and
- step 4: regulating, by the calibration regulation unit, the structure, geometric scale, and working parameters of the radio frequency circuit unit and working parameters of input/output nodes through the switch or switch array network.

After the above steps, the calibration control unit controls the radio frequency circuit unit through the calibration regulation unit to work in a desired condition, and regulates performance parameters (such as carrier frequency, bandwidth, gain, noise figure, output power, efficiency, linearity, error vector amplitude EVM, adjacent channel suppression, interference suppression, attenuation accuracy, phase shifting accuracy, and matching) of the circuit unit, so as to achieve programmable, configurable, adaptive, and real-time calibration and performance optimization of the radio frequency circuit unit;

The calibration regulation unit regulates the structure, geometric scale, and working parameters (such as voltage, gain, amplitude, phase, and matching) of the circuit unit and the working parameters of the input/output nodes through the switch or switch array network;

Component parameters of the inductors, capacitors, resistors, transmission lines, and transformers of the calibration regulation unit are discrete or continuously variable values, thereby achieving discrete or continuous regulation on performance parameters such as carrier frequency and channel bandwidth;

The inductance is regulated by parameters such as turns, radius, and line width; the capacitance is regulated by parameters such as plate length and width; the resistance and the transmission line are regulated by geometric or electrical scales such as length and width; the transformer is regulated by the coupling inductor parameters;

The circuit structure, geometric scale, and working parameters of the circuit unit are selected through the switch or switch array network.

As a preferred solution of the present invention, in step 4, the method for calibrating the frequency mixing transceiver in the radio frequency domain includes the following steps:
- step 4-A1: controlling, by the calibration control units, the calibration regulation units corresponding to the circuit devices to calibrate the circuit devices, including:
- controlling, by the calibration control unit, the calibration regulation unit for the low noise amplifier to calibrate performance parameters (such as noise figure, gain, and linearity) of the low noise amplifier;
- controlling, by the calibration control unit, the calibration regulation unit for the mixer (including the down-mixer and the up-mixer) to calibrate performance parameters (such as noise figure, gain, and linearity) of the mixer;
- controlling, by the calibration control unit, the calibration regulation unit for the power amplifier or driver amplifier to calibrate performance parameters (such as gain, output power, efficiency, and linearity) of the power amplifier or driver amplifier;
- controlling, by the calibration control unit, the calibration regulation unit for the programmable gain amplifier (including the receiver PGA and the transmitter PGA) to calibrate the DC offset and other performance parameters (such as gain, flatness, total harmonic distortion, and IQ mismatch) of the programmable gain amplifier;
- controlling, by the calibration control unit, the calibration regulation unit for the filter (including the receiver filter and the transmitter filter) to calibrate the DC offset and other performance parameters (such as center frequency, bandwidth, gain, flatness, total harmonic distortion, roll-off speed, and IQ mismatch) of the filter;
- controlling the center frequency of a radio frequency filter to regulate and calibrate the center frequency of the transceiver; controlling the bandwidth of an intermediate frequency filter to regulate and calibrate a channel bandwidth of the transceiver;
- controlling, by the calibration control unit, the calibration regulation unit for the operational amplifier to calibrate the DC offset and other performance parameters (such as gain, phase margin, gain-bandwidth product, slew rate, power supply rejection ratio, and common mode rejection ratio) of the operational amplifier;

controlling, by the calibration control unit, the calibration regulation unit for the frequency synthesizer (including the receiver FS and the transmitter FS) to calibrate performance parameters (such as frequency, amplitude, phase noise, jitter, and orthogonal mismatch of local oscillator signals) of the frequency synthesizer;

step 4-A2: controlling, by the calibration control units, the calibration regulation units corresponding to the circuit modules to calibrate the circuit modules, including:

controlling, by the calibration control units, the calibration regulation units for radio frequency receiver front-end circuit modules, including the low noise amplifier and the down-mixer, to calibrate performance parameters (such as input matching, output matching, working frequency range, noise figure, and gain) of the radio frequency receiver front-end circuit modules;

controlling, by the calibration control units, the calibration regulation units for radio frequency transmitter front-end circuit modules, including the power amplifier and the up-mixer, to calibrate performance parameters (such as input matching, output matching, working frequency range, output power, and gain) of the radio frequency transmitter front-end circuit modules;

controlling, by the calibration control units, the calibration regulation units for analog baseband circuit modules, including the programmable gain amplifiers and the filters, to calibrate performance parameters (such as bandwidth, gain, and stability) of the analog baseband circuit modules;

step 4-A3: controlling, by the calibration control units, the calibration regulation units corresponding to the receiving chain and transmitting chain in the frequency mixing transceiver to calibrate the receiving chain and transmitting chain in the frequency mixing transceiver, including:

controlling, by the calibration control unit, the calibration regulation unit for the receiving chain in the frequency mixing transceiver to calibrate performance parameters (such as input matching, output matching, working frequency range, noise figure, and gain) of the receiving chain in the frequency mixing transceiver; and controlling, by the calibration control unit, the calibration regulation unit for the transmitting chain in the frequency mixing transceiver to calibrate performance parameters (such as input matching, output matching, working frequency range, output power, and gain) of the transmitting chain in the frequency mixing transceiver.

Through the above steps, the calibration control units control the calibration regulation units to regulate the structures, geometric scales, and working parameters of the circuit devices or circuit modules in the receiving chain and transmitting chain of each channel in the frequency mixing transceiver, and the working parameters of input/output nodes, so as to achieve real-time calibration and performance optimization on the frequency mixing transceiver.

As a preferred solution of the present invention, the calibration method for the radio frequency domain calibration system, in step 4, regulating and calibrating the phase shifting transceiver includes:

step 4-B1: controlling, by the calibration control units, the calibration regulation units corresponding to the circuit devices to calibrate the circuit devices, including:

controlling, by the calibration control unit, the bias regulation subunit, the amplitude regulation subunit, and the phase regulation subunit for the low noise amplifier to calibrate performance parameters (such as noise figure, gain, and linearity) of the low noise amplifier;

controlling, by the calibration control unit, the bias regulation subunit, the amplitude regulation subunit, and the phase regulation subunit for the power amplifier or driver amplifier to calibrate performance parameters (such as gain, output power, efficiency, and linearity) of the power amplifier or driver amplifier;

controlling, by the calibration control unit, the bias regulation subunit and the phase regulation subunit for the phase shifter (including the receiver phase shifter and the transmitter phase shifter) to calibrate performance parameters (such as phase shifting accuracy, gain, linearity, noise figure) of the phase shifter;

controlling, by the calibration control unit, the bias regulation subunit and the amplitude regulation subunit for the attenuator (including the receiver attenuator and the transmitter attenuator) to calibrate performance parameters (such as attenuation accuracy, gain, linearity, and noise figure) of the attenuator;

controlling, by the calibration control units, transmission line structures and geometric scales of the transmission line regulation subunits in the power synthesizer and the power distributor to calibrate the performance parameters (such as matching, insertion loss, and isolation) of the power synthesizer and the power distributor;

step 4-B2: controlling, by the calibration control units, the calibration regulation units corresponding to the circuit modules to calibrate the circuit modules, including:

controlling, by the calibration control units, input matching regulation subunits and output matching regulation subunits of the amplitude and phase control circuit modules, in the receiver phase shifter and the receiver attenuator, to calibrate performance parameters (such as input matching, output matching, working frequency range, noise figure, and gain) of the receiver amplitude and phase control circuit modules;

controlling, by the calibration control units, input matching regulation subunits and output matching regulation subunits of the amplitude and phase control circuit modules, in the transmitter phase shifter and the transmitter attenuator, to calibrate performance parameters (such as input matching, output matching, working frequency range, output power, and gain) of the transmitter amplitude and phase control circuit modules;

step 4-B3: controlling, by the calibration control units, the calibration regulation units corresponding to the receiving chain and transmitting chain in the phase shifting transceiver to calibrate the receiving chain and transmitting chain in the phase shifting transceiver, including:

controlling, by the calibration control units, input matching regulation subunits and output matching regulation subunits of the receiving chain and transmitting chain in the phase shifting transceiver to calibrate performance parameters (such as input matching, output matching, working frequency range, noise figure, and gain) of the receiving chain and performance parameters (such as input matching, output matching, working frequency range, output power, and gain) of the transmitting chain, in the phase shifting.

Through the above steps, the calibration control units control the calibration regulation units to regulate the structures, geometric scales, and working parameters of the circuit devices or circuit modules in the receiving chain and transmitting chain of each channel in the phase shifting transceiver, and the working parameters of input/output nodes, so as to achieve real-time calibration and performance optimization on the phase shifting transceiver.

As a preferred solution of the present invention, in the calibration method for the radio frequency domain calibration system, the calibration control unit controls the calibration regulation unit, and in step 4, regulating the reconfigurable transceiver or circuit module includes:
- step 4-C1: controlling, by the calibration control unit, the calibration regulation unit to regulate circuit structures, geometric scales, working parameters of the reconfigurable regulation circuit and reconfigurable circuit devices, working parameters of input/output nodes, frequencies, and bandwidths;
- step 4-C2: controlling, by the calibration control unit, the calibration regulation unit to regulate working parameters of the reconfigurable regulation circuit and reconfigurable circuit modules, working parameters of input/output nodes, frequencies, and bandwidths; and
- step 4-C3: controlling, by the calibration control unit, the calibration regulation unit to regulate working parameters of the reconfigurable regulation circuit and the reconfigurable transceiver, working parameters of input/output nodes, frequencies, and bandwidths.

Through the above steps, the calibration control unit controls the calibration regulation unit, so that the reconfigurable transceiver or circuit module works in a desired mode, frequency band, bandwidth, or protocol, and achieves real-time switching and performance optimization;

The circuit structures, geometric scales, and working parameters of the circuit units are selected through switches or switch array networks;

Response time for real-time switching and calibration between different frequency bands and bandwidths is mainly determined by locking time of a phase-locked loop of the transceiver.

As an improvement of the present invention, the calibration method for the radio frequency domain calibration system with the feedback circuit unit further includes the following steps:
- step 5-R1: sampling, by the calibration observation receiver, signals of one or more input/output nodes of the radio frequency circuit unit;
- step 5-R2: detecting and quantifying, by the signal detection unit, the signals received by the calibration observation receiver; and
- step 5-R3: controlling, by the calibration control unit, the calibration regulation unit according to the detection and quantification results to regulate and calibrate the radio frequency circuit unit in real time.

As an improvement of the present invention, the radio frequency domain pre-distortion calibration includes the following steps:
- step 5-S1: sampling, by the calibration observation receiver, the following circuit units or nodes, including:
  sampling signals of input/output nodes of one or more circuit devices in the transmitting chain;
  sampling signals of input/output node signals of transmitting front-end circuit modules and analog baseband circuit modules in the transmitting chain; and
  sampling signals of an input node of the transmitting antenna;
- step 5-S2: detecting and quantifying, by the signal detection unit, the signals received by the calibration observation receiver; and
- step 5-S3: controlling, by the calibration control unit, the calibration regulation unit according to the detection and quantification results to perform the radio frequency domain pre-distortion calibration on the circuit devices or modules in the transmitting chain.

As an improvement of the present invention, after the radio frequency domain calibration, jointly calibrating the transceiver circuit system or circuit module in the radio frequency domain and the digital domain further includes the following steps:
for the receiving chain of the transceiver circuit system:
- step 5-T1: converting the signals calibrated in the radio frequency domain into digital signals by the ADC;
- step 5-T2: driving, by the digital calibration control program in the MCU for digital domain calibration, the digital calibration algorithm program of the digital calibration algorithm circuit to calibrate output signals of the ADC;

for the transmitting chain of the transceiver circuit system:
- step 5-P1: driving, by the digital calibration control program in the MCU for digital domain calibration, the digital calibration algorithm program of the digital calibration algorithm circuit to calibrate input digital signals of the DAC;
- step 5-P2: converting the digital signals calibrated in the digital domain into analog signals by the DAC; and
- step 6: iteratively calibrating the receiving chain and the transmitting chain.

Compared to the existing technologies, the advantages of the present invention are as follows: the present invention provides a radio frequency domain (or analog domain) calibration system for radio frequency circuit units, where circuit components and circuit modules or circuit systems (such as transceivers) formed by connecting circuit components are subjected to programmable, adaptive, and real-time regulation and calibration by calibration units in circuit structures, geometric scales, and working parameters (such as voltage, gain, amplitude, phase, and matching), so that the circuit units work in desired conditions; and performance parameters (such as carrier frequency, bandwidth, gain, noise figure, output power, efficiency, linearity, error vector amplitude EVM, adjacent channel suppression, interference suppression, attenuation accuracy, phase shifting accuracy, and matching) of the circuit unit are regulated in real time and optimized according to the corresponding working states. To achieve similar calibration performance, conventional digital domain calibration systems need to first convert radio frequency signals into digital signals by an ADC, and then to calibrate the signals with a dedicated calibration algorithm program for a specific function (such as wireless communication). As a contrast, the radio frequency domain calibration system and method of the present invention neither require the ADC to convert analog signals into digital signals, nor rely on calibration algorithms for specific types of applications, but are applicable to different functions, different types (communication, radar, navigation, electronic countermeasures, and the like), and different structures (frequency mixing, phase shifting structures, or the like), and can work in different protocols or modes (such as TDD/FDD); and with programmable, adaptive, real-time, and high-precision calibration capabilities, the calibration system has smaller chip area, lower cost, and higher flexibility in module configuration (such as ADC).

DETAILED DESCRIPTION OF THE EMBODIMENTS

Figure 1:
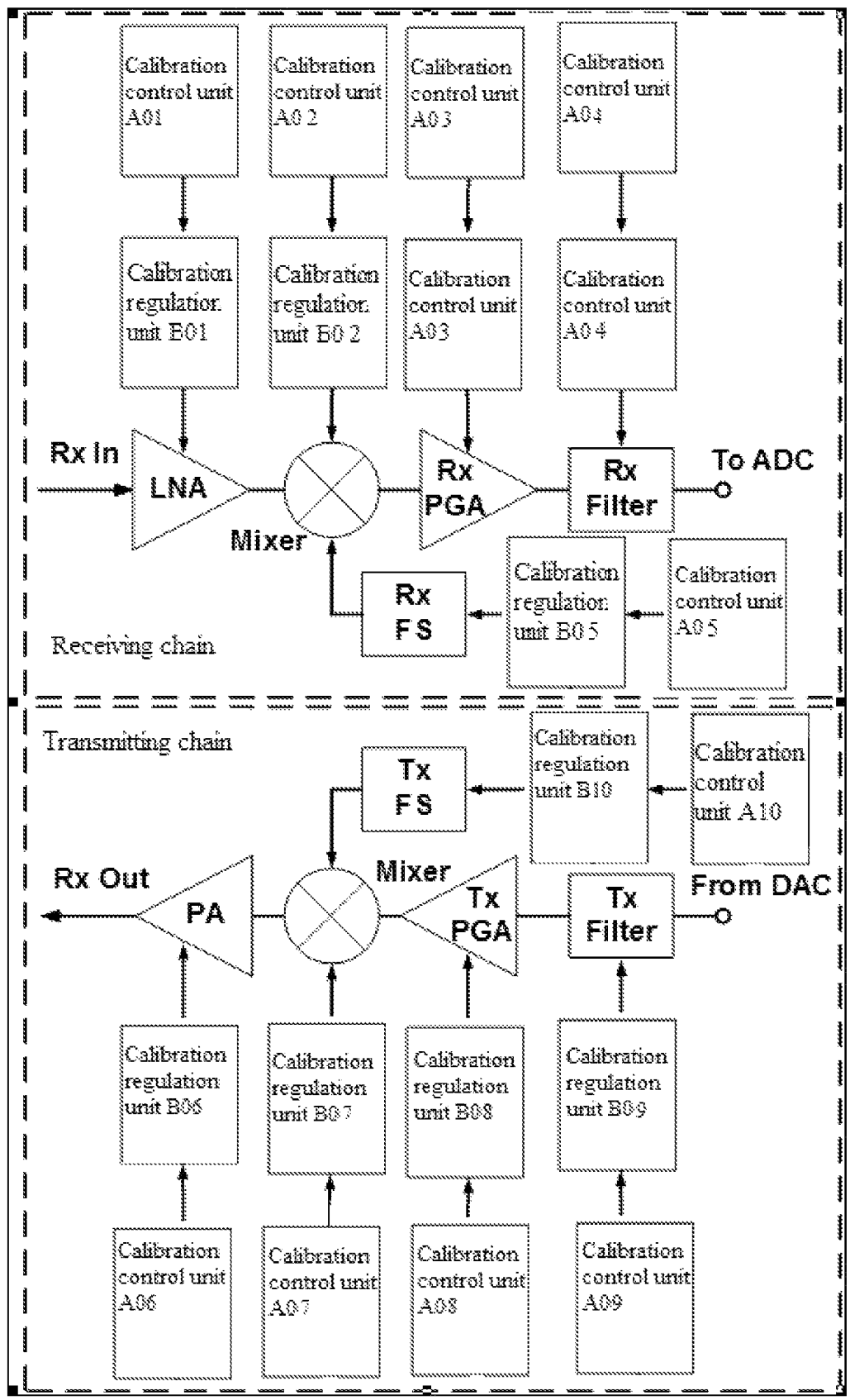
FIG. 1 is a block diagram of a radio frequency domain calibration system for circuit units according to the present invention, where in the radio frequency domain, circuit devices and circuit modules of a frequency mixing transceiver are calibrated by calibration units.

Embodiments of the present invention are described in detail below, and examples of the embodiments are shown in the accompanying drawings. The embodiments described below with reference to the accompanying drawings are exemplary, are only used for explaining the present invention, and cannot be understood as limiting the present invention.

The present invention provides a radio frequency domain calibration system and method for radio frequency circuit units, where programmable, configurable, adaptive, real-time regulation and calibration are implemented in the radio frequency domain for radio frequency circuit units (including circuit devices, modules and transceiver circuit systems) through calibration units, so that the circuit units may work in desired conditions with optimized performances. Compared with digital domain calibration systems and methods in existing technologies, the radio frequency domain calibration system of the present invention has smaller chip area, lower cost, and higher regulation flexibility and module configuration flexibility.

Embodiment 1: A radio frequency domain calibration system for radio frequency circuit units includes a calibration unit and a circuit unit;

The circuit unit includes one or more of radio frequency devices, or circuit modules, or transceiver circuit systems consisting of circuit components;

The calibration unit includes a calibration control unit and a calibration regulation unit;

The calibration control unit includes a memory, an arithmetic unit, a logic control unit, and a bus;

The memory is configured to store calibration instructions;

The arithmetic unit is configured for data operation in the calibration control unit;

The logic control unit is configured to extract the instructions from the memory, decode the instructions, and send corresponding control signals;

The bus is configured to connect the arithmetic unit, the memory, and the logic control unit, so as to implement information transfer and interaction among the arithmetic unit, the memory, and the logic control unit;

The calibration control unit generates calibration control signals to drive and regulate the calibration regulation unit;

The calibration control units of some or all of the circuit units are integrated together;

The calibration regulation unit includes switches or switch array networks, and one of or a combination of tuning networks (such as inductor or capacitor tuning networks), resistor networks, transmission line networks, transformer networks, transistors, diodes, and the like;

Component parameters of the inductors, capacitors, resistors, transmission lines, and transformers of the calibration regulation units are discrete or continuously variable values, thereby achieving discrete or continuous regulation on performance parameters such as carrier frequency and channel bandwidth;

The calibration regulation unit regulates the structure, geometric scale, and working parameters (such as voltage, gain, amplitude, phase, and matching) of the circuit unit and working parameters of input/output nodes through the switch or switch array network;

The calibration control unit is implemented by a silicon-based semiconductor process, and the circuit unit and the calibration regulation unit are implemented by the silicon-based semiconductor process or a compound semiconductor process. Circuits of the same process are integrated by a single chip, and circuits of different processes are integrated by a system-level package.

A calibration method for the foregoing radio frequency domain calibration system for radio frequency circuit units regulates and calibrates circuit structures, geometric scales, and working parameters of the radio frequency circuit units in real time through the calibration unit in the radio frequency domain;

The method includes the following steps:
Step 1: A calibration instruction is externally input or internally generated;
Step 2: The memory in the calibration control unit receives and stores the calibration instruction;
Step 3-1: The logic control unit in the calibration control unit fetches the calibration instruction from the memory;

Step 3-2: The arithmetic unit in the calibration control unit performs data operation according to the calibration instruction;

Step 3-3: The data generated by the arithmetic unit after operation are transmitted to the logic control unit by the bus for decoding;

Step 3-4: The logic control unit outputs a calibration control signal to drive and regulate the calibration regulation unit;

Step 4: The calibration regulation unit regulates the structure, geometric scale, and working parameters of the radio frequency circuit unit and working parameters of input/output nodes through the switch or switch array network;

After the above steps, the calibration control unit controls the radio frequency circuit unit through the calibration regulation unit to work in a desired condition, and regulates performance parameters (such as carrier frequency, bandwidth, gain, noise figure, output power, efficiency, linearity, error vector amplitude EVM, adjacent channel suppression, interference suppression, attenuation accuracy, phase shifting accuracy, and matching) of the circuit unit, so as to achieve programmable, configurable, adaptive, and real-time calibration and performance optimization of the radio frequency circuit unit;

The calibration regulation unit regulates the structure, geometric scale, and working parameters (such as voltage, gain, amplitude, phase, and matching) of the circuit unit and the working parameters of the input/output nodes through the switch or switch array network;

Component parameters of the inductors, capacitors, resistors, transmission lines, and transformers of the calibration regulation unit are discrete or continuously variable values, thereby achieving discrete or continuous regulation on performance parameters such as carrier frequency and channel bandwidth;

The inductance is regulated by parameters such as turns, radius, and line width; the capacitance is regulated by parameters such as plate length and width; the resistance and the transmission line are regulated by geometric or electrical scales such as length and width; the transformer is regulated by the coupling inductor parameters;

The circuit structure, geometric scale, and working parameters of the circuit unit are selected through the switch or switch array network.

Embodiment 2: As an improvement of the present invention, the calibration system further includes a micro-control unit (MCU) for radio frequency domain calibration; the calibration control units of some or all of the circuit units are integrated into the MCU for radio frequency domain calibration to control the corresponding calibration regulation units, so as to achieve programmable and real-time regulation and calibration of the circuit units. The remaining structures and advantages are identical to those in Embodiment 1.

Embodiment 3: As an improvement of the present invention, the radio frequency transceiver circuit system (transceiver) or circuit module in the calibration system includes a single channel or multiple channels, has a frequency mixing structure, a phase shifting structure, or a combination of the two, and works in one of or a combination of communication, radar, navigation, tracking, imaging, measurement, and electronic countermeasure modes, and its working frequency covers radio frequency bands, microwave or millimeter wave frequency bands, terahertz frequency band, or a combination of different frequency bands above.

Embodiment 4: As a preferred solution of the present invention, circuit devices or circuit modules regulated and calibrated by the calibration units in the radio frequency domain in the frequency mixing transceiver or circuit module include:

In a receiving chain (receiver) of the frequency mixing transceiver, after an antenna receives signals and before an ADC, the circuit devices include, but are not limited to, a low noise amplifier (LNA), a down-mixer, a receiver (Rx) frequency synthesizer (FS), a receiver (Rx) programmable gain amplifier (PGA), and a receiver filter (Rx Filter) in order of connection, where the receiver frequency synthesizer is connected to the down-mixer to provide local oscillator signals for the receiving chain;

In a transmitting chain (transmitter) of the frequency mixing transceiver, after a DAC and before the antenna transmits signals, the circuit devices include, but are not limited to, a transmitter filter (Tx Filter), a transmitter (Tx) programmable gain amplifier (PGA), a transmitter (Tx) frequency synthesizer (FS), an up-mixer, and a power amplifier (PA) or driver amplifier (DA) in order of connection, where the transmitter frequency synthesizer is connected to the up-mixer to provide local oscillator signals for the transmitting chain;

The calibration regulation units for the low noise amplifier, the mixers, and the power amplifier or driver amplifier each include a bias regulation subunit, an amplitude regulation subunit, and a phase regulation subunit;

The calibration regulation units for the programmable gain amplifiers, the filters, and the operational amplifier each include a bias regulation subunit, an amplitude regulation subunit, a phase regulation subunit, and a DC offset cancellation subunit;

The calibration regulation units for the frequency synthesizers each include an amplitude regulation subunit and a phase regulation subunit;

The receiver frequency synthesizer and the transmitter frequency synthesizer can be shared for transceivers of time division duplex (TDD) and full duplex (FD), and other types;

The frequency mixing transceiver includes one or more channels. The remaining structures and advantages are identical to those in Embodiment 1.

The calibration units control the calibration regulation units of the circuit units in each channel to regulate, calibrate, and optimize performance parameters (such as carrier frequency, bandwidth, gain, noise figure, output power, efficiency, linearity, error vector amplitude EVM, adjacent channel suppression, interference suppression, and matching) of the circuit units.

As a preferred solution of the present invention, in step 4 of the calibration method for the radio frequency domain calibration system described in Embodiment 1, the method for calibrating the frequency mixing transceiver in the radio frequency domain includes the following steps:

Step 4-A1: The calibration control units control the calibration regulation units corresponding to the circuit devices to calibrate the circuit devices, including:

The calibration control unit controls the calibration regulation unit for the low noise amplifier to calibrate the performance parameters (such as noise figure, gain, and linearity) of the low noise amplifier;

The calibration control unit controls the calibration regulation unit for the mixer (including the down-mixer and the up-mixer) to calibrate the performance parameters (such as noise figure, gain, and linearity) of the mixer;

The calibration control unit controls the calibration regulation unit for the power amplifier or driver amplifier to calibrate the performance parameters (such as gain, output power, efficiency, and linearity) of the power amplifier or driver amplifier;

The calibration control unit controls the calibration regulation unit for the programmable gain amplifier (including the receiver PGA and the transmitter PGA) to calibrate the DC offset and other performance parameters (such as gain, flatness, total harmonic distortion, and IQ mismatch) of the programmable gain amplifier;

The calibration control unit controls the calibration regulation unit for the filter (including the receiver filter and the transmitter filter) to calibrate the DC offset and other performance parameters (such as center frequency, bandwidth, gain, flatness, total harmonic distortion, roll-off speed, and IQ mismatch) of the filter;

The center frequency of a radio frequency filter is controlled to regulate and calibrate the center frequency of the transceiver; a bandwidth of an intermediate frequency filter is controlled to regulate and calibrate a channel bandwidth of the transceiver;

The calibration control unit controls the calibration regulation unit for the operational amplifier to calibrate the DC offset and other performance parameters (such as gain, phase margin, gain-bandwidth product, slew rate, power supply rejection ratio, and common mode rejection ratio) of the operational amplifier; and The calibration control unit controls the calibration regulation unit for the frequency synthesizer (including the receiver FS and the transmitter FS) to calibrate the performance parameters (such as frequency, amplitude, phase noise, jitter, and orthogonal mismatch of local oscillator signals) of the frequency synthesizer.

Step 4-A2: The calibration control units control the calibration regulation units corresponding to the circuit modules to calibrate the circuit modules, including:

The calibration control units control the calibration regulation units for radio frequency receiver front-end circuit modules, including the low noise amplifier and the down-mixer, to calibrate the performance parameters (such as input matching, output matching, working frequency range, noise figure, and gain) of the radio frequency receiver front-end circuit modules;

The calibration control units control the calibration regulation units for transmitter radio frequency front-end circuit modules, including the power amplifier or driver amplifier and the up-mixer, to calibrate the performance parameters (such as input matching, output matching, working frequency range, output power, and gain) of the transmitter radio frequency front-end circuit modules; and The calibration control units control the calibration regulation units for analog baseband circuit modules, including the programmable gain amplifiers and the filters, to calibrate performance parameters (such as bandwidth, gain, and stability) of the analog baseband circuit modules;

Step 4-A3: The calibration control units control the calibration regulation units corresponding to the receiving chain and transmitting chain in the frequency mixing transceiver to calibrate the receiving chain and transmitting chain in the frequency mixing transceiver, including:

The calibration control unit controls the calibration regulation unit for the receiving chain in the frequency mixing transceiver to calibrate the performance parameters (such as input matching, output matching, working frequency range, noise figure, and gain) of the receiving chain in the frequency mixing transceiver; and The calibration control unit controls the calibration regulation unit for the transmitting chain in the frequency mixing transceiver to calibrate the performance parameters (such as input matching, output matching, working frequency range, output power, and gain) of the transmitting chain in the frequency mixing transceiver.

Through the above steps, the calibration control units control the calibration regulation units to regulate the structures, geometric scales, and working parameters of the circuit devices or circuit modules in the receiving chain and transmitting chain of each channel in the frequency mixing transceiver, and the working parameters of input/output nodes, so as to achieve real-time calibration and performance optimization on the frequency mixing transceiver.

Embodiment 5: As another preferred solution of the present invention, circuit devices or circuit modules regulated and calibrated by the calibration units in the radio frequency domain in a phase shifting transceiver or circuit module include:

In a receiving chain of the phase shifting transceiver, after an antenna receives signals, the circuit devices regulated and calibrated by the calibration units include, but are not limited to, a low noise amplifier, a receiver phase shifter, a receiver attenuator, and a power synthesizer in order of connection; and In a transmitting chain of the phase shifting transceiver, after a power distributor performs power distribution on input signals and before the antenna transmits signals, the circuit devices regulated and calibrated by the calibration units include, but are not limited to, a transmitter attenuator, a transmitter phase shifter, and a power amplifier or driver amplifier in order of connection.

The calibration regulation units for the phase shifters each include a bias regulation subunit and a phase regulation subunit;

The calibration regulation units for the attenuators each include a bias regulation subunit and an amplitude regulation subunit;

The calibration regulation units for the power synthesizer and the power distributor each include a transmission line regulation subunit;

The phase shifting transceiver includes one or more channels. The remaining structures and advantages are identical to those in Embodiment 1.

The calibration units control the calibration regulation units of the circuit units in each channel to regulate, calibrate, and optimize performance parameters (such as phase shifting accuracy, attenuation accuracy, gain, linearity, noise figure, working frequency range, input matching, output matching, insertion loss, and isolation) of the circuit units.

As a preferred solution of the present invention, in step 4 of the calibration method for the radio frequency domain calibration system described in Embodiment 1, regulating and calibrating the phase shifting transceiver includes:

Step 4-B1: The calibration control units control the calibration regulation units corresponding to the circuit devices to calibrate the circuit devices, including:

The calibration control unit controls the bias regulation subunit, the amplitude regulation subunit, and the phase regulation subunit for the low noise amplifier to calibrate the performance parameters (such as noise figure, gain, and linearity) of the low noise amplifier;

The calibration control unit controls the bias regulation subunit, the amplitude regulation subunit, and the phase regulation subunit for the power amplifier or driver amplifier to calibrate the performance parameters (such as gain, output power, efficiency, and linearity) of the power amplifier or driver amplifier;

The calibration control unit controls the bias regulation subunit and the phase regulation subunit for the phase shifter (including the receiver phase shifter and the transmitter phase shifter) to calibrate the performance parameters (such as phase shifting accuracy, gain, linearity, noise figure) of the phase shifter;

The calibration control unit controls the bias regulation subunit and the amplitude regulation subunit for the attenuator (including the receiver attenuator and the transmitter attenuator) to calibrate the performance parameters (such as attenuation accuracy, gain, linearity, and noise figure) of the attenuator;

The calibration control units control transmission line structures and geometric scales of the transmission line regulation subunits in the power synthesizer and the power distributor to calibrate the performance parameters (such as matching, insertion loss, and isolation) of the power synthesizer and the power distributor;

Step 4-B2: The calibration control units control the calibration regulation units corresponding to the circuit modules to calibrate the circuit modules, including:

The calibration control units control input matching regulation subunits and output matching regulation subunits of the amplitude and phase control circuit modules, including the receiver phase shifter and the receiver attenuator, to calibrate the performance parameters (such as input matching, output matching, working frequency range, noise figure, and gain) of the amplitude and phase shifting circuit modules;

The calibration control units control input matching regulation subunits and output matching regulation subunits of the amplitude and phase control circuit modules, including the transmitter phase shifter and the transmitter attenuator, to calibrate the performance parameters (such as input matching, output matching, working frequency range, output power, and gain) of the amplitude and phase control circuit modules;

Step 4-B3: The calibration control units control the calibration regulation units corresponding to the receiving chain and transmitting chain in the phase shifting transceiver to calibrate the receiving chain and transmitting chain in the phase shifting transceiver, including:

The calibration control units control input matching regulation subunits and output matching regulation subunits of the receiving chain and transmitting chain in the phase shifting transceiver to calibrate the performance parameters (such as input matching, output matching, working frequency range, noise figure, and gain) of the receiving chain and the performance parameters (such as input matching, output matching, working frequency range, output power, and gain) of the transmitting chain, in the phase shifting transceiver.

Through the above steps, the calibration control units control the calibration regulation units to regulate the structures, geometric scales, and working parameters of the circuit devices or circuit modules in the receiving chain and transmitting chain of each channel in the phase shifting transceiver, and the working parameters of input/output nodes, so as to achieve real-time calibration and performance optimization on the phase shifting transceiver.

Embodiment 6: As another preferred solution of the present invention, the calibration system includes a reconfigurable transceiver or circuit module, a reconfigurable regulation circuit, and a calibration unit;

The reconfigurable regulation circuit is connected to reconfigurable circuit devices or modules (such as a frequency synthesizer, a low noise amplifier, a power amplifier, a mixer, and a filter);

The reconfigurable regulation circuit includes switches or switch array networks, and one of or a combination of tuning networks, resistor networks, transmission line networks, and transformer networks;

In the tuning network and the resistor network of the reconfigurable regulation circuit, component parameters of the inductors, capacitors, resistors, transmission lines, and transformers are discrete or continuously variable values to achieve discrete or continuous regulation on performance parameters such as carrier frequency range and channel bandwidth; and the reconfigurable transceiver includes one or more channels. The remaining structures and advantages are identical to those in Embodiment 1.

The calibration control unit controls the calibration regulation unit, so that the reconfigurable transceiver or circuit module works in a desired condition or state (such as mode, frequency band, channel bandwidth, and protocol), and performs real-time switching and performance optimization.

As a preferred solution of the present invention, in step 4 of the calibration method for the radio frequency domain calibration system described in Embodiment 1, regulating the reconfigurable transceiver or circuit module includes:

Step 4-C1: The calibration control unit controls the calibration regulation unit to regulate circuit structures, geometric scales, working parameters of the reconfigurable regulation circuit and reconfigurable circuit devices, working parameters of input/output nodes, frequencies, and bandwidths;

Step 4-C2: The calibration control unit controls the calibration regulation unit to regulate working parameters of the reconfigurable regulation circuit and reconfigurable circuit modules, working parameters of input/output nodes, frequencies, and bandwidths;

Step 4-C3: The calibration control unit controls the calibration regulation unit to regulate working parameters of the reconfigurable regulation circuit and the reconfigurable transceiver, working parameters of input/output nodes, frequencies, and bandwidths.

Through the above steps, the calibration control unit controls the calibration regulation unit, so that the reconfigurable transceiver or circuit module works in a desired mode, frequency band, bandwidth, or protocol, and achieves real-time switching and performance optimization;

The circuit structures, geometric scales, and working parameters of the circuit units are selected through switches or switch array networks;

Response time for real-time switching and calibration between different frequency bands and bandwidths is mainly determined by locking time of a phase-locked loop of the transceiver.

Embodiment 7: As an improvement of the present invention, the radio frequency domain calibration system further includes a feedback circuit unit;

The feedback circuit unit includes a calibration observation receiver, a signal detection unit, and a signal transmission unit;

The calibration observation receiver includes but is not limited to, from receiving input signals, one or more circuit devices of a low noise amplifier, a down-mixer, a receiver frequency synthesizer, a receiver programmable gain amplifier, and a receiver filter in order of connection, or re-use the receiving chain of a transceiver circuit system;

The calibration observation receiver is configured to receive signals output from the radio frequency circuit units;

The signal detection unit is configured to classify, extract, amplify, and quantify the signals received by the calibration observation receiver, and detect useful signals;

The signal transmission unit is configured to transmit the useful signals detected out by the signal detection unit to the calibration control unit;

The remaining structures and advantages are identical to those in Embodiment 1.

As an improvement of the present invention, the calibration method for the radio frequency domain calibration system with the feedback circuit unit further includes the following steps:

Step 5-R1: The calibration observation receiver samples signals of one or more input/output nodes of the radio frequency circuit unit;

Step 5-R2: The signal detection unit detects and quantifies the signals received by the calibration observation receiver; and Step 5-R3: The calibration control unit controls the calibration regulation unit according to the detection and quantification results to regulate and calibrate the radio frequency circuit unit in real time.

The remaining steps and advantages are the same as those of the calibration method in Embodiment 1.

Embodiment 8: As an improvement of the present invention, the feedback circuit unit is configured for radio frequency domain pre-distortion calibration of the transmitting chain in the transceiver circuit system. The remaining structures and advantages are identical to those in Embodiment 7.

As an improvement of the present invention, the radio frequency domain pre-distortion calibration includes the following steps:

Step 5-S1: The calibration observation receiver samples the following circuit units or nodes, including:
sampling signals of input/output nodes of one or more circuit devices in the transmitting chain;
sampling signals of input/output node signals of transmitting front-end circuit modules and analog baseband circuit modules in the transmitting chain; and
sampling signals of an input node of the transmitting antenna;

Step 5-S2: The signal detection unit detects and quantifies the signals received by the calibration observation receiver;

Step 5-S3: The calibration control unit controls the calibration regulation unit according to the detection and quantification results to perform the radio frequency domain pre-distortion calibration on the circuit devices or modules in the transmitting chain.

The remaining steps and advantages are the same as those of the calibration method in Embodiment 7.

Embodiment 9: As an improvement of the present invention, the radio frequency domain calibration system further includes a radio frequency domain and digital domain joint calibration circuit;

The radio frequency domain and digital domain joint calibration circuit includes a calibration unit and circuit unit in the radio frequency domain, an MCU for digital domain calibration, an ADC/DAC, a digital calibration algorithm circuit, a data interface circuit, and a baseband circuit;

The digital calibration algorithm circuit is configured to implement a digital calibration algorithm program;

The digital calibration algorithm program includes an orthogonal error correction (or calibration) algorithm, a DC offset correction algorithm, an IQ path mismatch correction algorithm, a local oscillator leakage correction algorithm, an image rejection correction algorithm, and a digital pre-distortion correction algorithm;

The MCU for digital domain calibration runs the digital calibration control program to control the digital calibration algorithm circuit, the data interface circuit, and the baseband circuit;

The data interface circuit (such as high-speed Serdes interface) is configured for information interaction between the digital calibration algorithm circuit and the baseband circuit; The baseband circuit is configured to process digital baseband signals.

As an improvement of the present invention, after the radio frequency domain calibration, jointly calibrating the transceiver circuit system or circuit module in the radio frequency domain and the digital domain further includes the following steps:

For the receiving chain of the transceiver circuit system:
Step 5-T1: The signals calibrated in the radio frequency domain are converted into digital signals by the ADC;
Step 5-T2: The digital calibration control program in the MCU for digital domain calibration drives the digital calibration algorithm program of the digital calibration algorithm circuit to calibrate output signals of the ADC;

For the transmitting chain of the transceiver circuit system:
Step 5-P1: The digital calibration control program in the MCU for digital domain calibration drives the digital calibration algorithm program of the digital calibration algorithm circuit to calibrate input digital signals of the DAC;
Step 5-P2: The digital signals calibrated in the digital domain are converted into analog signals by the DAC;
Step 6: The receiving chain and the transmitting chain are iteratively calibrated.

The remaining steps and advantages are the same as those of the calibration method in Embodiment 1.

Embodiment 10

As another preferred solution of the present invention, at least one technical feature in Embodiments 2-9 may be combined with another or more embodiments to form new implementations according to actual needs.

Detailed Descriptions are Provided as Follows with Reference to the Accompanying Drawings:

FIG. 1 is a block diagram of a radio frequency domain calibration system for circuit units according to the present invention. In the radio frequency domain, circuit devices and circuit modules of a frequency mixing transceiver are calibrated by calibration units.

The frequency mixing transceiver includes a receiving chain and a transmitting chain;

In the receiving chain, a low noise amplifier LNA, a receiver mixer, a receiver frequency synthesizer FS, a receiver programmable gain amplifier PGA, and a receiver filter are connected to corresponding calibration units (including calibration regulation units and calibration control units) respectively, where the receiver frequency synthesizer is connected to the receiver mixer;

In the transmitting chain, a power amplifier PA or driver amplifier DA, a transmitter mixer, a transmitter frequency synthesizer FS, a transmitter programmable gain amplifier PGA, and a transmitter filter are connected to corresponding calibration units (including calibration regulation units and calibration control units) respectively, where the transmitter frequency synthesizer is connected to the transmitter mixer.

Figure 2:
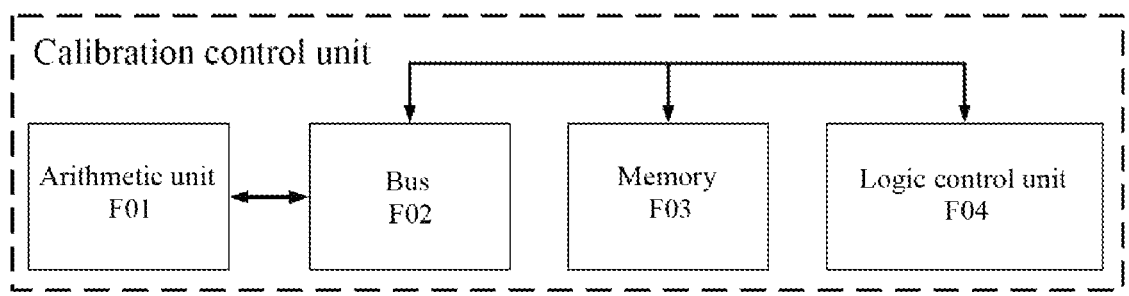
FIG. 2 is a structural block diagram of a calibration control unit in the radio frequency domain calibration system for circuit units according to the present invention.

FIG. 2 is a structural block diagram of a calibration control unit in the radio frequency domain calibration system for circuit units according to the present invention.

The calibration control unit includes an arithmetic unit F01, a bus F02, a memory F03, and a logic control unit F04;

The arithmetic unit F01 is configured for data operation in the calibration control unit; The memory F03 is configured to store calibration instructions;

The logic control unit F04 is configured to extract the instructions from the memory, decode the instructions, and send corresponding control signals;

The bus F02 is configured to connect the arithmetic unit, the memory, and the logic control unit, so as to implement information transfer and interaction among the arithmetic unit, the memory, and the logic control unit;

Information interaction can be directly performed between the memory F03 and the logic control unit F04.

Figure 3:
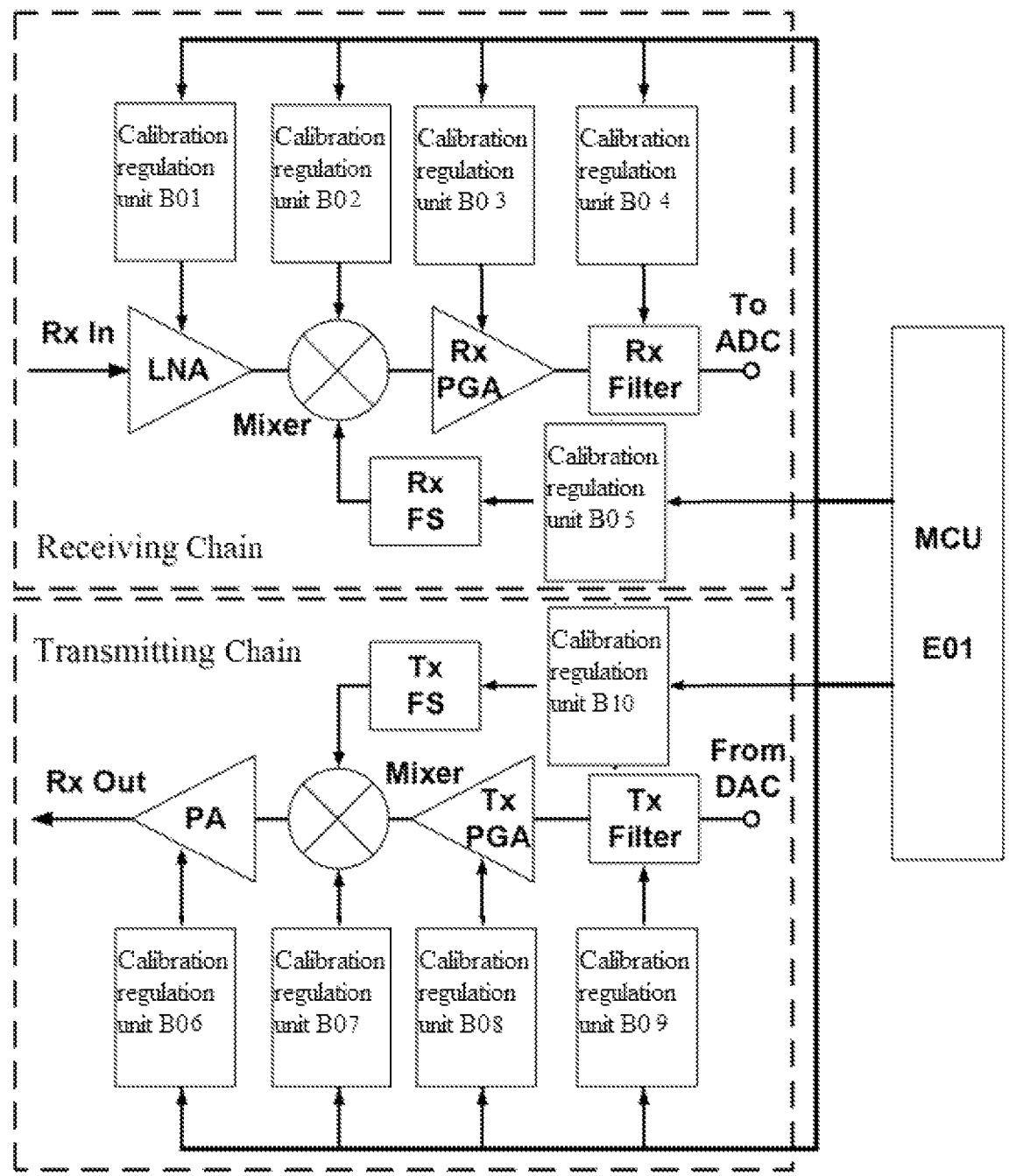
FIG. 3 is a system block diagram of an exemplary embodiment of the radio frequency domain calibration system for circuit units according to the present invention, where calibration control units are integrated into an MCU for radio frequency domain calibration.

FIG. 3 is a system block diagram of an exemplary embodiment of the radio frequency domain calibration system for circuit units according to the present invention.

The calibration control units of some or all of the circuit units are integrated into a micro-control unit (MCU) E01 for radio frequency domain calibration, thereby improving the automation, programmability, and scalability of the calibration system.

Figure 4:
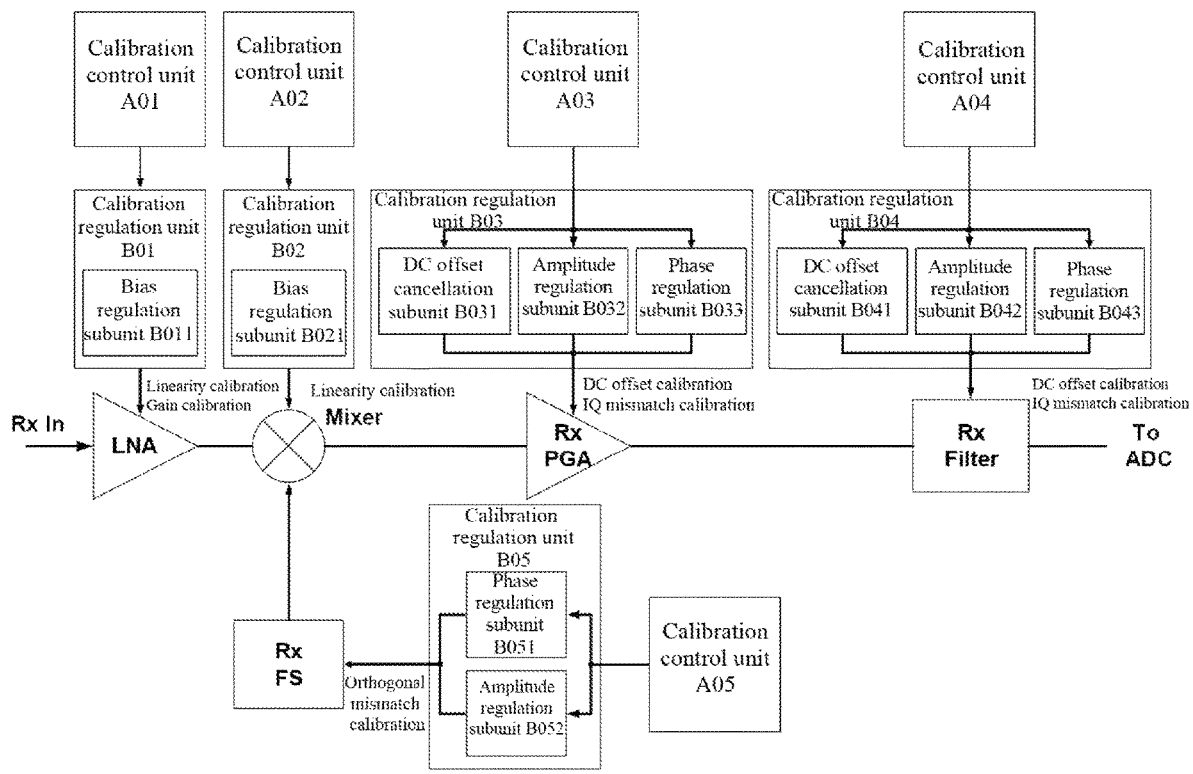
FIG. 4 is a block diagram of a radio frequency domain calibration system for circuit units according to the present invention, where in the radio frequency domain, circuit devices and circuit modules in a receiving chain of a frequency mixing transceiver are calibrated by calibration units.

FIG. 4 is a block diagram of a radio frequency domain calibration system for circuit units according to the present invention. In the radio frequency domain, circuit devices and circuit modules in a receiving chain of a frequency mixing transceiver are calibrated by calibration units to work in desired conditions and achieve performance optimization.

After an antenna receives signals and before an analog-to-digital signal converter (ADC), the circuit devices calibrated by the calibration units include, in order of connection, a low noise amplifier LNA, a receiver mixer, a receiver frequency synthesizer FS, a receiver programmable gain amplifier PGA, and a receiver filter, where the receiver frequency synthesizer is connected to the receiver mixer to provide local oscillator signals for the receiving chain;

A calibration regulation unit B01 of the low noise amplifier includes a bias regulation subunit B011, an amplitude regulation subunit B012, and a phase regulation subunit B013 (B012 and B013 are omitted in the figure); a calibration control unit A01 of the low noise amplifier controls the bias regulation subunit B011, the amplitude regulation subunit B012, and the phase regulation subunit B013 to calibrate and optimize performance parameters (such as noise figure, gain, and linearity) of the low noise amplifier;

A calibration regulation unit B02 of the receiver mixer includes a bias regulation subunit B021, an amplitude regulation subunit B022, and a phase regulation subunit B023; a calibration control unit A02 controls the bias regulation subunit B021, the amplitude regulation subunit B022, and the phase regulation subunit B023 to calibrate and optimize performance parameters (such as noise figure, gain, and linearity) of the receiver mixer;

A calibration regulation unit B03 of the receiver programmable gain amplifier includes a DC offset cancellation subunit B031, an amplitude regulation subunit B032, and a phase regulation subunit B033; a calibration control unit A03 controls the DC offset cancellation subunit B031 to calibrate the DC offset of the receiver programmable gain amplifier; the calibration control unit A03 controls the amplitude regulation subunit B032 and the phase regulation subunit B033 to calibrate and optimize other performance parameters (such as gain, flatness, total harmonic distortion, and IQ mismatch) of the receiver programmable gain amplifier;

A calibration regulation unit B04 of the receiver filter includes a DC offset cancellation subunit B041, an amplitude regulation subunit B042, and a phase regulation subunit B043; a calibration control unit A04 controls the DC offset cancellation subunit B041 to calibrate the DC offset of the receiver filter C04; the calibration control unit A04 controls the amplitude regulation subunit B042 and the phase regulation subunit B043 to calibrate and optimize other performance parameters (such as bandwidth, gain, flatness, total harmonic distortion, roll-off speed, and IQ mismatch) of the receiver filter; the bandwidth of the receiver filter is controlled to regulate and calibrate a receiver channel bandwidth;

A calibration regulation unit B05 of the receiver frequency synthesizer includes an amplitude regulation subunit B052 and a phase regulation subunit B051; a calibration control unit A05 controls the amplitude regulation subunit B052 and the phase regulation subunit B051 to calibrate and optimize performance parameters (such as frequency, amplitude, phase noise, jitter, and orthogonal mismatch) of the receiver frequency synthesizer.

Figure 5:
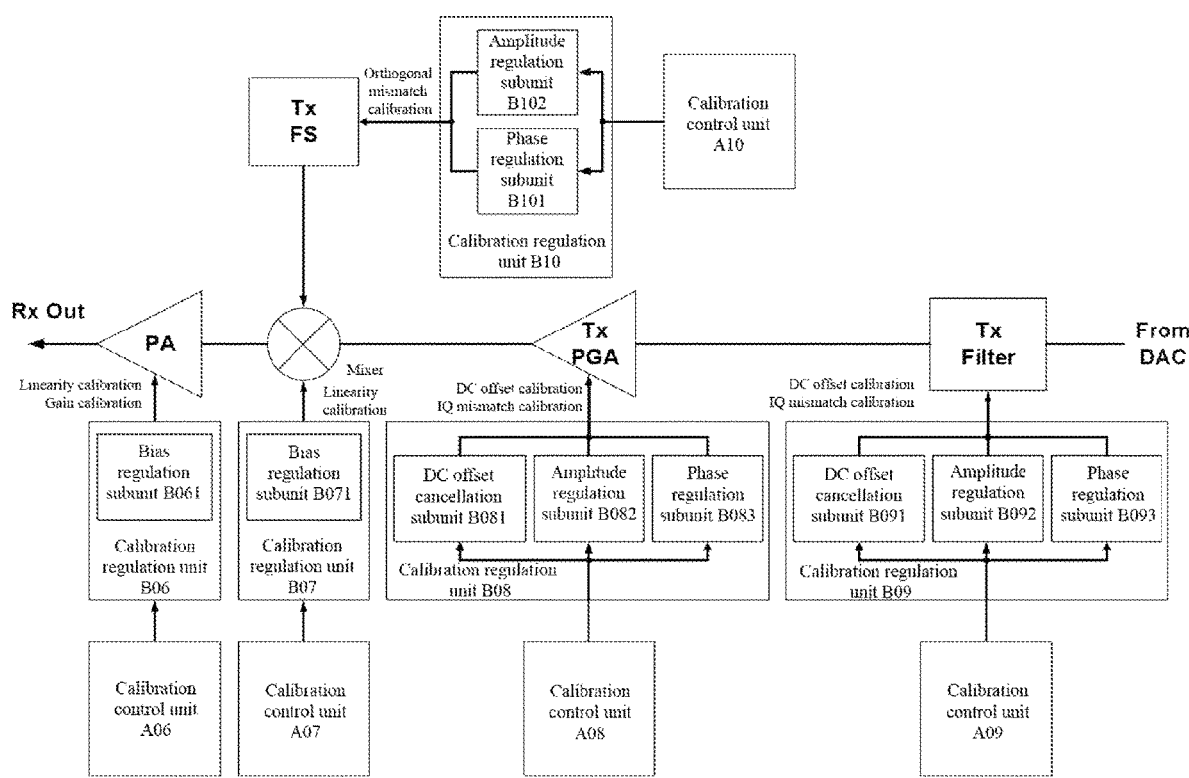
FIG. 5 is a block diagram of a radio frequency domain calibration system for circuit units according to the present invention, where in the radio frequency domain, circuit devices and circuit modules in a transmitting chain of a frequency mixing transceiver are calibrated by calibration units.

FIG. 5 is a block diagram of a radio frequency domain calibration system for circuit units according to the present invention. In the radio frequency domain, circuit devices and circuit modules in a transmitting chain of a frequency mixing transceiver are calibrated by calibration units to work in desired conditions and achieve performance optimization.

After digital signals sent by a baseband pass through a digital-to-analog signal converter (DAC) and before the antenna transmits signals, the circuit devices calibrated by the calibration units include, in order of connection, a power amplifier PA or driver amplifier, a transmitter mixer, a transmitter frequency synthesizer FS, a transmitter programmable gain amplifier PGA, and a transmitter filter, where the transmitter frequency synthesizer is connected to the transmitter mixer to provide local oscillator signals for the transmitting chain;

A calibration regulation unit B06 of the power amplifier or driver amplifier includes a bias regulation subunit B061, an amplitude regulation subunit B062, and a phase regulation subunit B063 (B062 and B063 are omitted in the figure); a calibration control unit A06 of the power amplifier or driver amplifier controls the bias regulation subunit B061, the amplitude regulation subunit B062, and the phase regulation subunit B063 to calibrate and optimize performance parameters (such as gain, output power, efficiency, and linearity) of the power amplifier or driver amplifier;

A calibration regulation unit B07 of the transmitter mixer includes a bias regulation subunit B071, an amplitude regulation subunit B072, and a phase regulation subunit B073; a calibration control unit A07 controls the bias regulation subunit B071, the amplitude regulation subunit B072, and the phase regulation subunit B073 to calibrate and optimize performance parameters (such as noise figure, gain, and linearity) of the transmitter mixer;

A calibration regulation unit B08 of the transmitter programmable gain amplifier includes a DC offset cancellation subunit B081, an amplitude regulation subunit B082, and a phase regulation subunit B083; a calibration control unit A08 controls the DC offset cancellation subunit B081 to calibrate the DC offset of the transmitter programmable gain amplifier D03; the calibration control unit A08 controls the amplitude regulation subunit B082 and the phase regulation subunit B083 to calibrate and optimize other performance parameters (such as gain, flatness, total harmonic distortion, and IQ mismatch) of the programmable gain amplifier;

A calibration regulation unit B09 of the transmitter filter includes a DC offset cancellation subunit B091, an amplitude regulation subunit B092, and a phase regulation subunit B093; a calibration control unit A09 controls the DC offset cancellation subunit B091 to calibrate the DC offset of the transmitter filter D04; the calibration control unit A09 controls the amplitude regulation subunit B092 and the phase regulation subunit B093 to calibrate and optimize other performance parameters (such as bandwidth, gain, flatness, total harmonic distortion, roll-off speed, and IQ mismatch) of the transmitter filter; the bandwidth of the transmitter filter is controlled to regulate and calibrate a transmitter channel bandwidth;

A calibration regulation unit B10 of the transmitter frequency synthesizer includes an amplitude regulation subunit B102 and a phase regulation subunit B101; a calibration control unit A10 controls the amplitude regulation subunit B102 and the phase regulation subunit B101 to calibrate and optimize performance parameters (such as frequency, amplitude, phase noise, jitter, and orthogonal mismatch of local oscillator signals) of the transmitter frequency synthesizer;

The receiver frequency synthesizer and the transmitter frequency synthesizer can be shared for transceivers of time division duplex (TDD), full duplex (FD), and other types.

Figure 6:
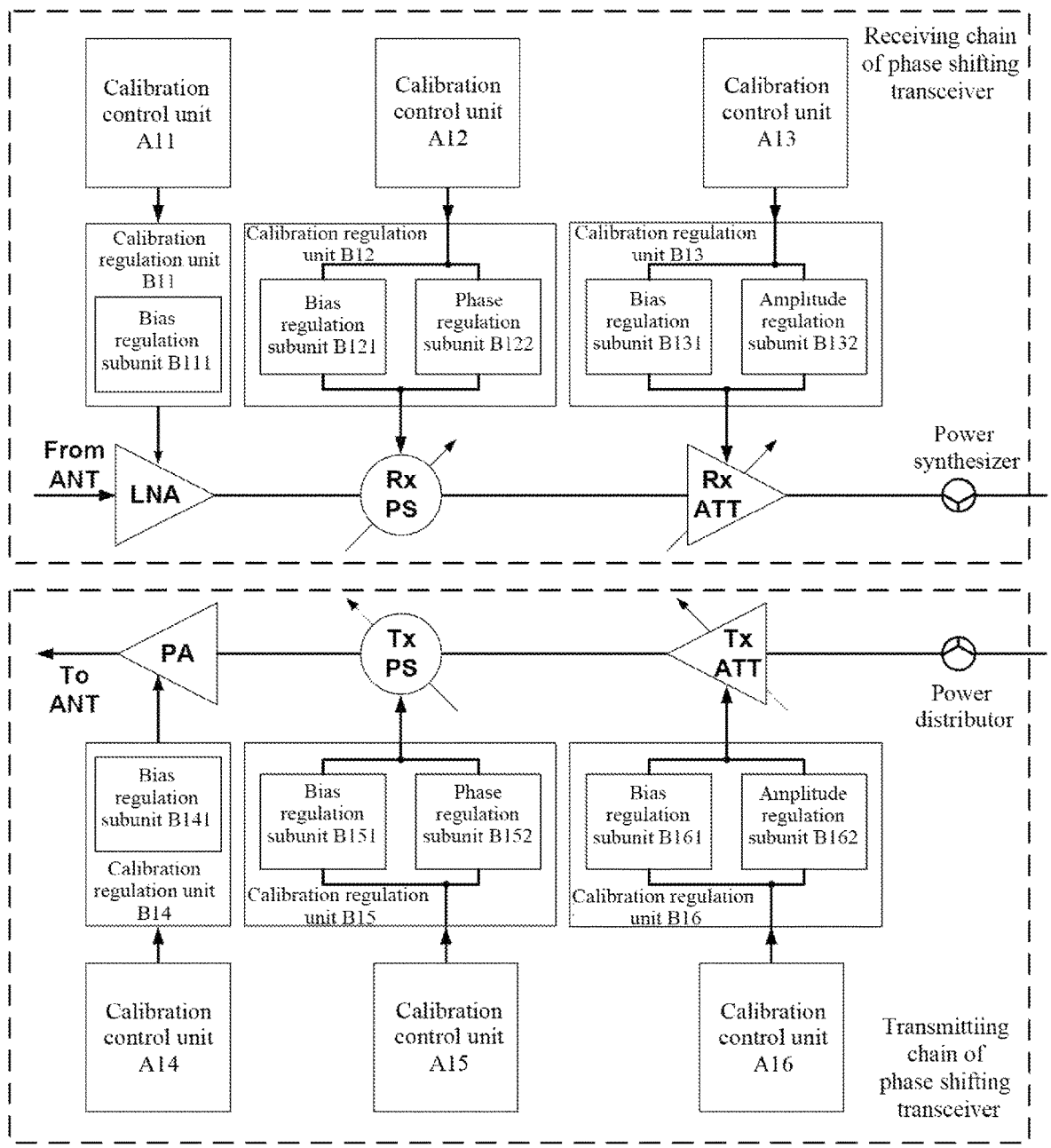
FIG. 6 is a block diagram of a radio frequency domain calibration system for circuit units according to the present invention, where in the radio frequency domain, circuit devices and circuit modules in a receiving chain and a transmitting chain of a phase shifting transceiver are calibrated by calibration units.

FIG. 6 is a block diagram of a radio frequency domain calibration system for circuit units according to the present invention. In the radio frequency domain, circuit devices and circuit modules in a receiving chain and a transmitting chain of a phase shifting transceiver are calibrated by calibration units to work in desired conditions and achieve performance optimization.

In the receiving chain of each channel of the phase shifting transceiver, after signals are received from the antenna, the circuit devices calibrated by the calibration units include, in order of connection, a low noise amplifier LNA, a receiver phase shifter PS, a receiver attenuator ATT, and a power synthesizer;

In the transmitting chain of each channel of the phase shifting transceiver, before the antenna transmits signals, the circuit devices calibrated by the calibration units include, in order of connection, a power amplifier PA or driver amplifier, a transmitter phase shifter PS, a transmitter attenuator ATT, and a power distributor;

A calibration regulation unit B11 of the low noise amplifier includes a bias regulation subunit B111, an amplitude regulation subunit B112, and a phase regulation subunit B113 (B112 and B113 are omitted in the figure); a calibration control unit A11 controls the bias regulation subunit B111, the amplitude regulation subunit B112, and the phase regulation subunit B113 to calibrate and optimize performance parameters (such as noise figure, gain, and linearity) of the low noise amplifier;

A calibration regulation unit B12 of the receiver phase shifter includes a bias regulation subunit B121 and a phase regulation subunit B122; a calibration control unit A12 controls the bias regulation subunit B121 and the phase regulation subunit B122 to calibrate and optimize performance parameters (such as phase shifting accuracy, gain, linearity, and noise figure) of the receiver phase shifter;

A calibration regulation unit B13 of the receiver attenuator includes a bias regulation subunit B131 and an amplitude regulation subunit B132; a calibration control unit A13 controls the bias regulation subunit B131 and the amplitude regulation subunit B132 to calibrate and optimize performance parameters (such as attenuation accuracy, gain, linearity, and noise figure) of the receiver attenuator;

A calibration regulation unit B14 of the power amplifier or driver amplifier includes a bias regulation subunit B141, an amplitude regulation subunit B142, and a phase regulation subunit B143 (B142 and B143 are omitted in the figure); a calibration control unit A14 controls the bias regulation subunit B141, the amplitude regulation subunit B142, and the phase regulation subunit B143 to calibrate and optimize performance parameters (such as gain, output power, efficiency, and linearity) of the power amplifier or driver amplifier;

A calibration regulation unit B15 of the transmitter phase shifter includes a bias regulation subunit B151 and a phase regulation subunit B152; a calibration control unit A15 controls the bias regulation subunit B151 and the phase regulation subunit B152 to calibrate and optimize performance parameters (such as phase shifting accuracy, gain, linearity, and noise figure) of the transmitter phase shifter;

A calibration regulation unit B16 of the transmitter attenuator includes a bias regulation subunit B161 and an amplitude regulation subunit B162; a calibration control unit A16 controls the bias regulation subunit B161 and the amplitude regulation subunit B162 to calibrate and optimize performance parameters (such as attenuation accuracy, gain, linearity, and noise figure) of the transmitter attenuator;

A calibration regulation unit of the power synthesizer and the power distributor includes a transmission line regulation subunit; a calibration control unit controls the structure and geometric scale of the transmission line regulation subunit to calibrate and optimize performance parameters (such as match, insertion loss, and port isolation) of the power synthesizer and the power distributor.

Figure 7:
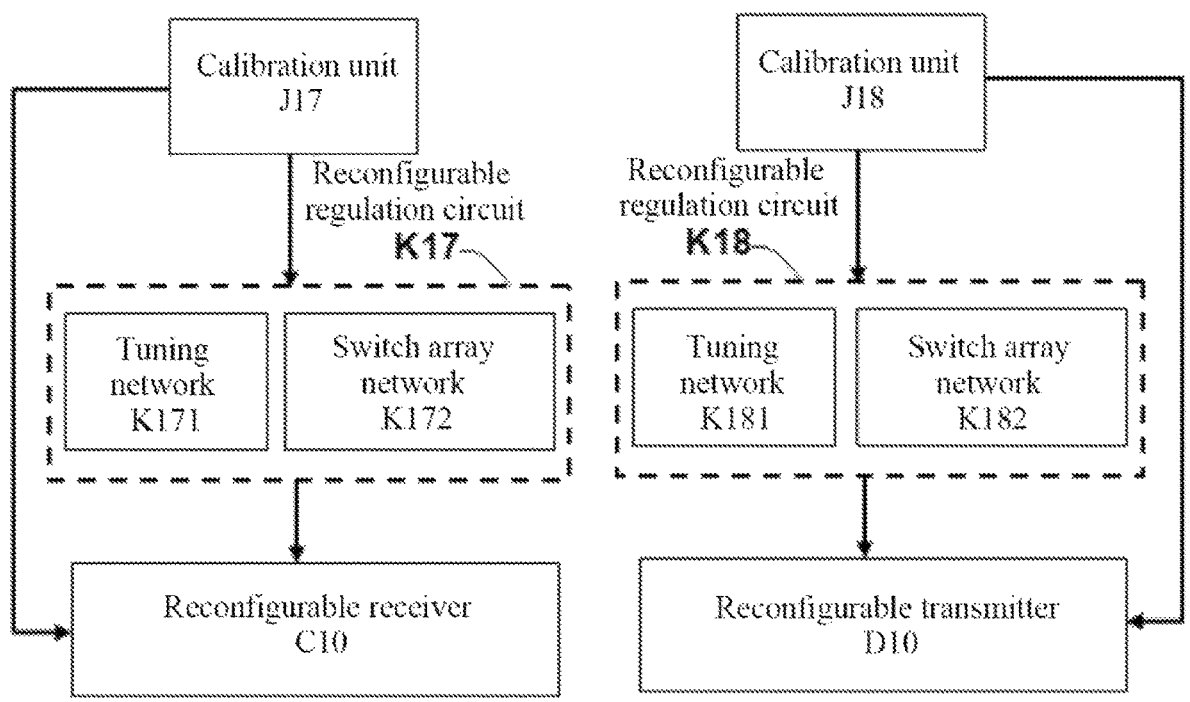
FIG. 7 is a structural block diagram of a reconfigurable transceiver, a reconfigurable regulation circuit, and calibration units in a radio frequency domain calibration system for circuit units according to the present invention.

FIG. 7 is a structural block diagram of a reconfigurable transceiver, a reconfigurable regulation circuit, and calibration units in a radio frequency domain calibration system for circuit units according to the present invention. In the radio frequency domain, the reconfigurable regulation circuit and circuit device and circuit modules of the reconfigurable transceiver are regulated and calibrated by the calibration unit to work in desired conditions and achieve performance optimization.

The reconfigurable transceiver includes a reconfigurable receiver C10, a reconfigurable transmitter D10, a receiver calibration unit J17, a receiver reconfigurable regulation circuit K17, a transmitter calibration unit J18, and a transmitter reconfigurable regulation circuit K18;

The receiver reconfigurable regulation circuit K17 includes a receiver tuning network K171 and a receiver switch array network K172;

The transmitter reconfigurable regulation circuit K18 includes a transmitter tuning network K181 and a transmitter switch array network K182;

The receiver calibration unit J17 regulates and calibrates the receiver reconfigurable regulation circuit K17 and the reconfigurable receiver C10;

The transmitter calibration unit J18 regulates and calibrates the transmitter reconfigurable regulation circuit K18 and the reconfigurable transmitter D10.

Figure 8:
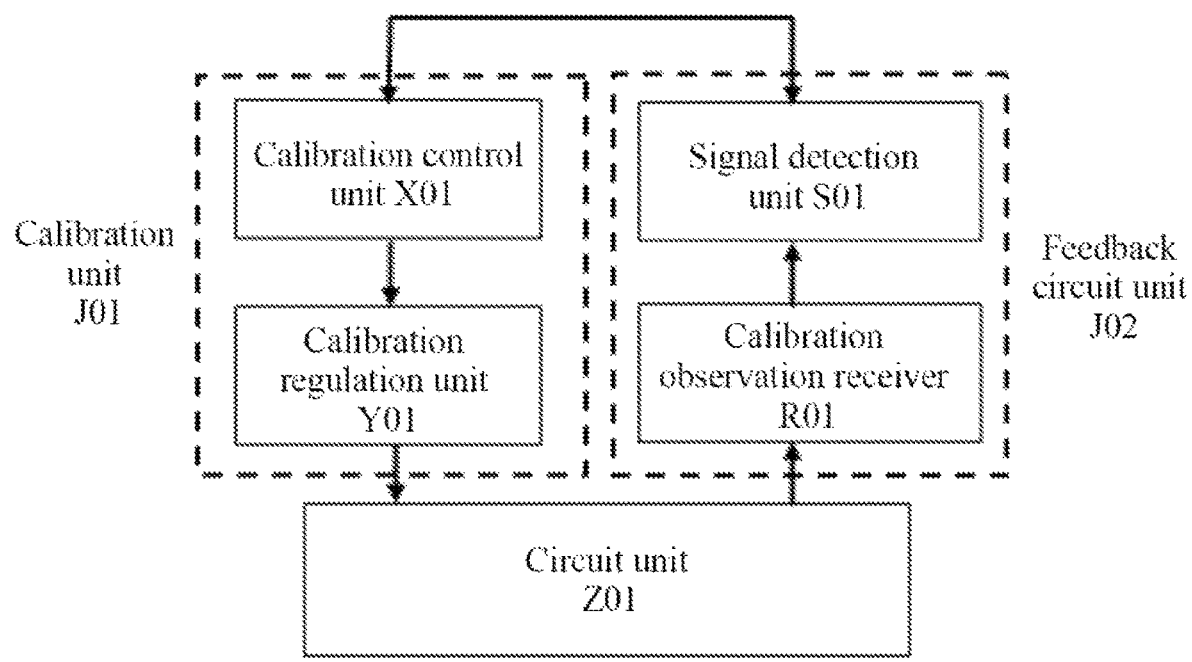
FIG. 8 is a structural block diagram of a radio frequency domain calibration system for circuit units according to the present invention, including a circuit unit, a calibration unit, and a feedback circuit unit.

FIG. 8 is a structural block diagram of a radio frequency domain calibration system for circuit units according to the present invention.

A calibration unit J01 includes a calibration control unit X01 and a calibration regulation unit Y01;

The calibration control unit X01 controls the calibration regulation unit Y01 to calibrate a circuit unit Z01 in the radio frequency domain;

The calibration system further includes a feedback circuit unit J02;

The feedback circuit unit J02 includes a calibration observation receiver R01, a signal detection unit S01, and a signal transmission unit;

The calibration observation receiver R01 first samples one or more input/output node signals of the circuit unit, then the signal detection unit S01 detects and quantifies the signals received by the calibration observation receiver, and the signal transmission unit transmits useful signals detected out by the signal detection unit to the calibration control unit; and then the calibration control unit X01 controls the calibration regulation unit Y01 according to the detection and quantification results to perform radio frequency domain calibration and performance optimization on the circuit unit.

Figure 9:
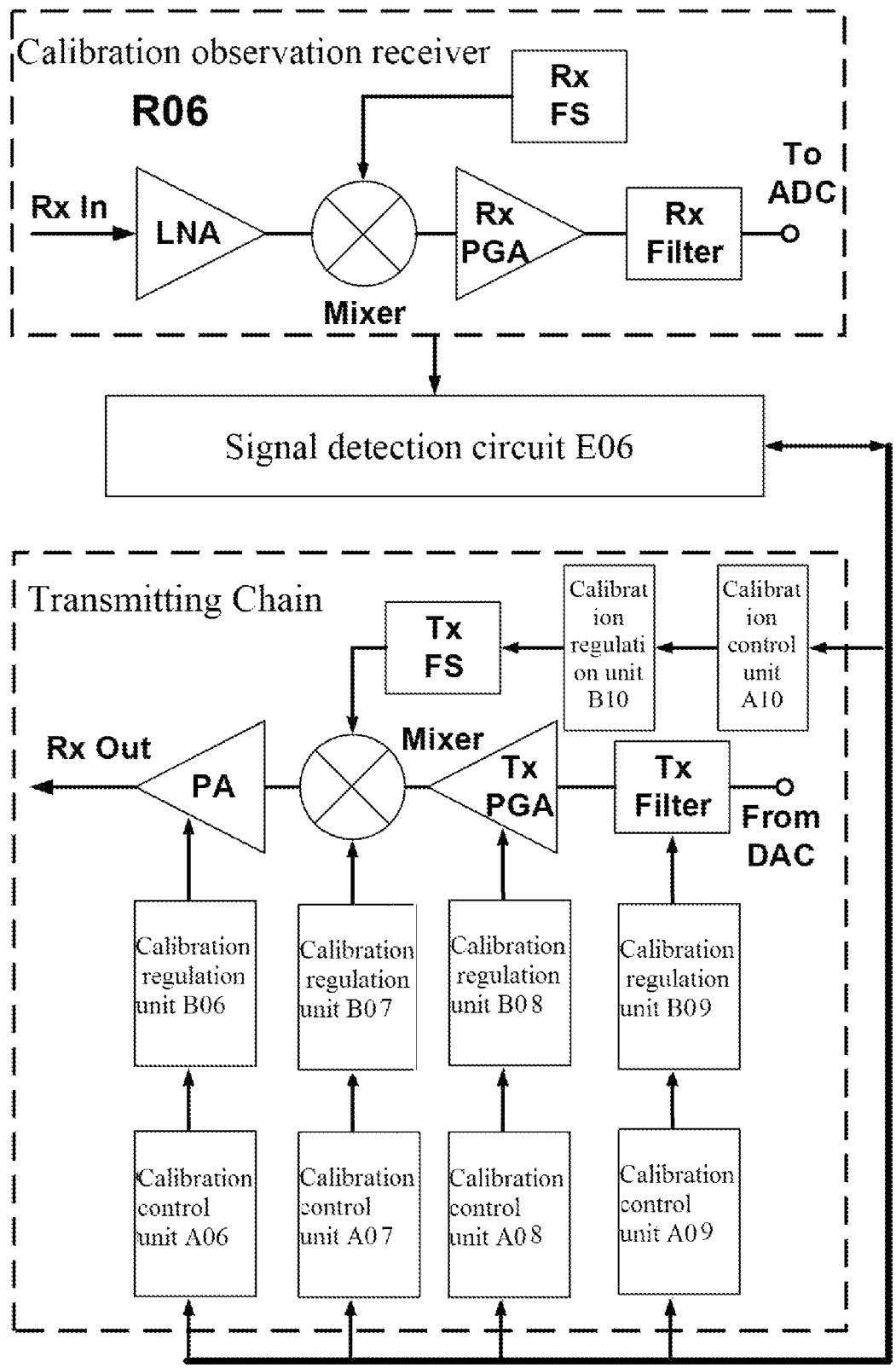
FIG. 9 is a system block diagram of an exemplary embodiment of radio frequency domain pre-distortion calibration of a transmitting chain in a radio frequency domain calibration system for circuit units according to the present invention.

FIG. 9 is a system block diagram of an exemplary embodiment of radio frequency domain pre-distortion calibration of a transmitting chain in a radio frequency domain calibration system for circuit units according to the present invention.

The frequency domain pre-distortion calibration circuit includes a calibration observation receiver R06, a signal detection unit E06, a calibration control unit, and a calibration regulation unit;

The calibration observation receiver R06 includes, in order of connection, one or more circuit devices of a low noise amplifier, a receiver mixer, a receiver frequency synthesizer, a receiver programmable gain amplifier, and a receiver filter, or re-use the receiving chain of a transceiver circuit system;

The calibration observation receiver R06 samples one or more input/output node signals of transmitting chain circuit devices, then the signal detection unit E06 detects and quantifies the signals received by the calibration observation receiver R06, and the calibration control unit controls the calibration regulation unit according to the detection and quantization results to perform radio frequency domain pre-distortion calibration on the transmitting chain or circuit modules.

Figure 10:
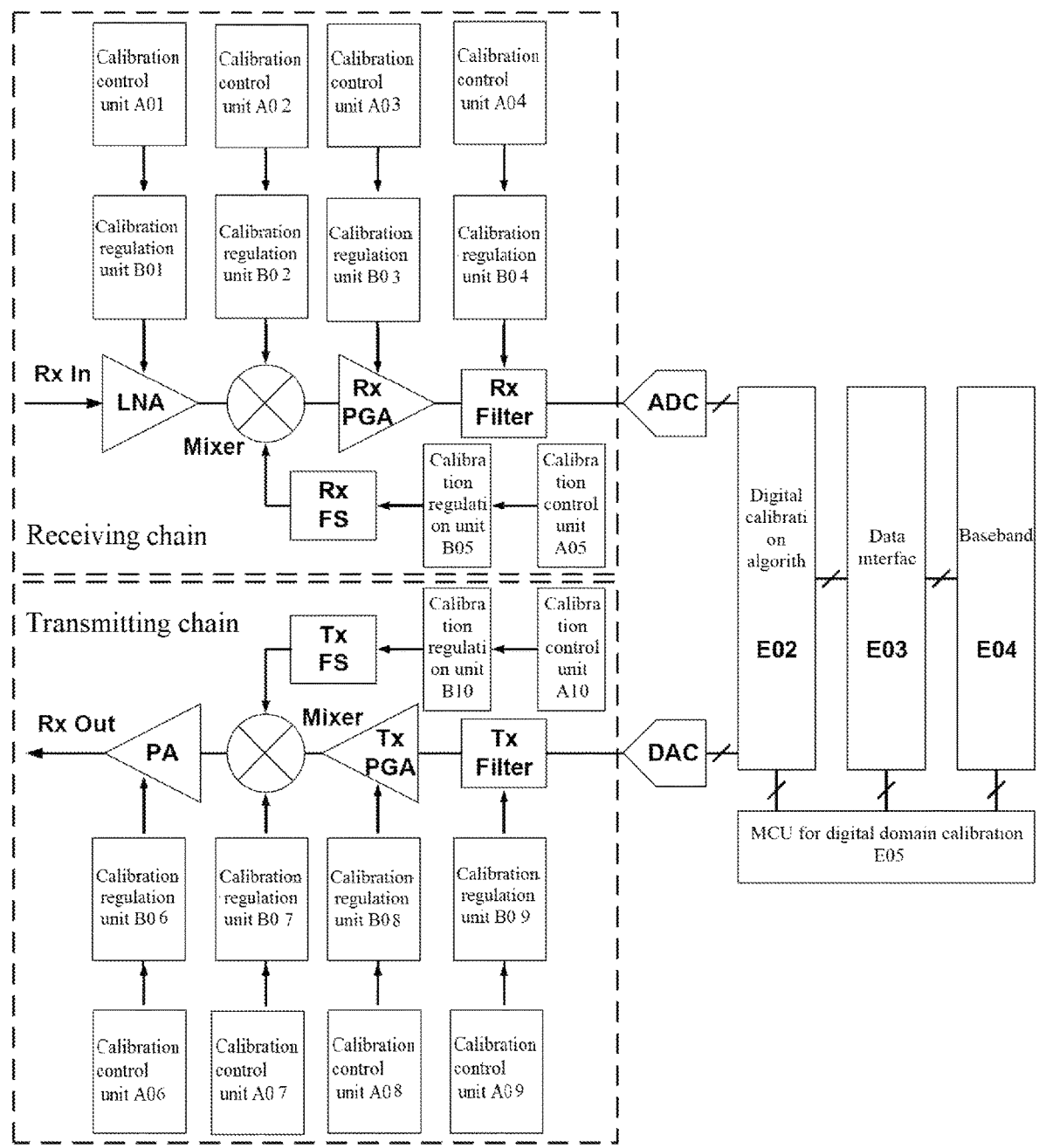
FIG. 10 is a system block diagram of an exemplary embodiment of joint calibration in the radio frequency domain and the digital domain in a radio frequency domain calibration system for circuit units according to the present invention.

FIG. 10 is a system block diagram of an exemplary embodiment of joint calibration in the radio frequency domain and the digital domain according to the present invention, where a radio frequency transceiver circuit system (transceiver) or circuit modules are jointly calibrated in the radio frequency domain and the digital domain.

For a receiving chain of the transceiver, the receiving chain is first calibrated in the radio frequency domain, signals calibrated in the radio frequency domain are converted into digital signals by an ADC, and then a digital calibration control program in an MCU for digital domain calibration E05 drives a digital calibration algorithm program in a digital calibration algorithm circuit (E02) to calibrate output signals of the ADC;

For a transmitting chain of the transceiver, the transmitting chain is first calibrated in the radio frequency domain, then the digital calibration control program in the MCU for digital domain calibration E05 drives the digital calibration algorithm program in the digital calibration algorithm circuit E02 to calibrate input digital signals of a DAC; the digital signals calibrated in the digital domain are converted into analog signals by the DAC;

The MCU for digital domain calibration E05 runs the digital calibration control program to control the digital calibration algorithm circuit E02, a data interface circuit E03, and a baseband circuit E04;

The digital calibration algorithm circuit E02 is configured to implement the digital calibration algorithm program;

The data interface circuit E03 is configured for information interaction between the digital calibration algorithm circuit E02 and the baseband circuit E04;

The baseband circuit E04 is configured to process digital baseband signals.

The above embodiments are merely intended to illustrate the technical idea of the present invention and cannot limit the scope of protection of the present invention. Any equivalent replacement, combination, or modification made based on the technical idea and technical solutions of the present invention without departing from the essence and scope of the technical solutions of the present invention shall fall within the claims and scope of protection of the present invention.

What is claimed is:

1. A radio frequency domain calibration system for radio frequency circuit units, comprising calibration units and radio frequency circuit units, wherein
    the calibration unit comprises a calibration control unit and a calibration regulation unit;
    the calibration control unit comprises a memory, an arithmetic unit, a logic control unit, and a bus;
    the memory is configured to store calibration instructions;
    the arithmetic unit is configured for data operation in the calibration control unit;
    the logic control unit is configured to extract the instructions from the memory, decode the instructions, and send corresponding control signals;
    the bus is configured to connect the arithmetic unit, the memory, and the logic control unit, so as to implement information transfer and interaction among the arithmetic unit, the memory, and the logic control unit;
    the calibration control unit generates calibration control signals to drive and regulate the calibration regulation unit;
    the calibration control units of the radio frequency circuit units are integrated together;
    the calibration regulation unit comprises switches or switch array networks, and one of or a combination of tuning networks, resistor networks, transmission line networks, and transformer networks;
    component parameters of inductors, capacitors, resistors, transmission lines, and transformers of the calibration regulation unit are discrete or continuously variable values;
    the calibration regulation unit regulates structure, geometric scale, and working parameters of the radio frequency circuit unit and working parameters of input/output nodes through the switch or switch array network; and
    the calibration control unit is implemented by a silicon-based semiconductor process, and the radio frequency circuit unit and the calibration regulation unit are implemented by the silicon-based semiconductor process or a compound semiconductor process; circuits of the same process are integrated by a single chip, and circuits of different processes are integrated by a system-level package.

2. The radio frequency domain calibration system for radio frequency circuit units according to claim 1, further comprising an MCU for radio frequency domain calibration, wherein the calibration control units of the radio frequency circuit units are integrated into the MCU for radio frequency domain calibration.

3. The radio frequency domain calibration system for radio frequency circuit units according to claim 1, wherein a radio frequency transceiver circuit system or circuit module regulated and calibrated by the calibration unit comprises a single channel or multiple channels, has a frequency mixing structure, a phase shifting structure, or a combination of the two, and works in one of or a combination of communication, radar, navigation, tracking, imaging, measurement, and electronic countermeasure modes, and its working frequency covers radio frequency bands, microwave or millimeter wave frequency bands, terahertz frequency band, or a combination of different frequency bands above.

4. The radio frequency domain calibration system for radio frequency circuit units according to claim 3, wherein circuit devices or circuit modules regulated and calibrated by the calibration units in the radio frequency domain in the frequency mixing transceiver or circuit module comprise:
   in a receiving chain of the frequency mixing transceiver, after an antenna receives signals, the circuit devices comprise a low noise amplifier, a down-mixer, a receiver frequency synthesizer, a receiver programmable gain amplifier, and a receiver filter in order of connection, wherein the receiver frequency synthesizer is connected to the down-mixer to provide local oscillator signals for the receiving chain; and
   in a transmitting chain of the frequency mixing transceiver, before the antenna transmits signals, the circuit devices comprise a transmitter filter, a transmitter programmable gain amplifier, a transmitter frequency synthesizer, an up-mixer, and a power amplifier or driver amplifier in order of connection, wherein the transmitter frequency synthesizer is connected to the up-mixer to provide local oscillator signals for the transmitting chain;
   wherein the calibration regulation units for the low noise amplifier, the mixers, and the power amplifier or driver amplifier each comprise a bias regulation subunit, an amplitude regulation subunit, and a phase regulation subunit;
   the calibration regulation units for the programmable gain amplifiers, the filters, and the operational amplifier each comprise a bias regulation subunit, an amplitude regulation subunit, a phase regulation subunit, and a DC offset cancellation subunit; and
   the calibration regulation units for the frequency synthesizers each comprise an amplitude regulation subunit and a phase regulation subunit.

5. The radio frequency domain calibration system for radio frequency circuit units according to claim 3, wherein circuit devices or circuit modules regulated and calibrated by the calibration units in the radio frequency domain in the phase shifting transceiver or circuit module comprise:
   in a receiving chain of the phase shifting transceiver, after an antenna receives signals, the circuit devices regulated and calibrated by the calibration units comprise a low noise amplifier, a receiver phase shifter, a receiver attenuator, and a power synthesizer in order of connection; and
   in a transmitting chain of the phase shifting transceiver, after a power distributor performs power distribution on input signals and before the antenna transmits signals, the circuit devices regulated and calibrated by the calibration units comprise a transmitter attenuator, a transmitter phase shifter, and a power amplifier or driver amplifier in order of connection;
   wherein the calibration regulation units for the phase shifters each comprise a bias regulation subunit and a phase regulation subunit;
   the calibration regulation units for the attenuators each comprise a bias regulation subunit and an amplitude regulation subunit; and
   the calibration regulation units for the power synthesizer and the power distributor each comprise a transmission line regulation subunit.

6. The radio frequency domain calibration system for radio frequency circuit units according to claim 3, wherein the calibration system comprises a reconfigurable transceiver or circuit module, a reconfigurable regulation circuit, and a calibration unit;
   wherein the reconfigurable regulation circuit comprises switches or switch array networks, and one of or a combination of tuning networks, resistor networks, transmission line networks, and transformer networks;
   in the tuning network and the resistor network of the reconfigurable regulation circuit, component parameters of the inductors, capacitors, resistors, transmission lines, and transformers are discrete or continuously variable values; and
   the reconfigurable regulation circuit is connected to reconfigurable circuit components or modules in the reconfigurable transceiver.

7. The radio frequency domain calibration system for radio frequency circuit units according to claim 1, further comprising a feedback circuit unit, wherein
   the feedback circuit unit comprises a calibration observation receiver, a signal detection unit, and a signal transmission unit;
   the calibration observation receiver comprises, from receiving input signals, one or more circuit devices of a low noise amplifier, a down-mixer, a receiver frequency synthesizer, a receiver programmable gain amplifier, and a receiver filter in order of connection, or re-use the receiving chain of a transceiver circuit system;
   the calibration observation receiver is configured to receive signals output from the radio frequency circuit units;
   the signal detection unit is configured to classify, extract, amplify, and quantify the signals received by the calibration observation receiver, and detect useful signals; and
   the signal transmission unit is configured to transmit the useful signals detected out by the signal detection unit to the calibration control unit.

8. The radio frequency domain calibration system for radio frequency circuit units according to claim 7, wherein the feedback circuit unit is configured for radio frequency domain pre-distortion calibration of the transmitting chain in the transceiver circuit system.

9. The radio frequency domain calibration system for radio frequency circuit units according to claim 1, wherein the radio frequency domain calibration system further comprises a radio frequency domain and digital domain joint calibration circuit;
   the radio frequency domain and digital domain joint calibration circuit comprises a calibration unit and circuit unit in the radio frequency domain, an MCU for digital domain calibration, an ADC/DAC, a digital calibration algorithm circuit, a data interface circuit, and a baseband circuit;

the digital calibration algorithm circuit is configured to implement a digital calibration algorithm program;

the digital calibration algorithm program comprises an orthogonal error correction algorithm, a DC offset correction algorithm, an IQ path mismatch correction algorithm, a local oscillator leakage correction algorithm, an image rejection correction algorithm, and a digital pre-distortion correction algorithm;

the MCU for digital domain calibration runs the digital calibration control program to control the digital calibration algorithm circuit, the data interface circuit, and the baseband circuit;

the data interface circuit is configured for information interaction between the digital calibration algorithm circuit and the baseband circuit; and the baseband circuit is configured to process digital baseband signals.

10. A calibration method for the radio frequency domain calibration system for radio frequency circuit units according to claim 1, comprising the following steps:

step 1: externally inputting or internally generating a calibration instruction;

step 2: receiving and storing, by the memory in the calibration control unit, the calibration instruction;

step 3-1: fetching, by the logic control unit in the calibration control unit, the calibration instruction from the memory;

step 3-2: performing, by the arithmetic unit in the calibration control unit, data operation according to the calibration instruction;

step 3-3: transmitting data generated by the arithmetic unit after operation to the logic control unit by the bus for decoding;

step 3-4: outputting, by the logic control unit, a calibration control signal to drive and regulate the calibration regulation unit; and step 4: regulating, by the calibration regulation unit, the structure, geometric scale, and working parameters of the radio frequency circuit unit and working parameters of input/output nodes through the switch or switch array network; and controlling, by the calibration control unit, the radio frequency circuit unit through the calibration regulation unit to work in a desired condition, so as to achieve programmable, configurable, adaptive, and real-time calibration and performance optimization of the radio frequency circuit unit.

11. The calibration method for the radio frequency domain calibration system for radio frequency circuit units according to claim 10, wherein in step 4, regulating and calibrating the frequency mixing transceiver comprises:

step 4-A1: controlling, by the calibration control units, the calibration regulation units corresponding to the circuit devices to calibrate the circuit devices, comprising:

controlling, by the calibration control units, the bias regulation subunits, the amplitude regulation subunits, and the phase regulation subunits for the low noise amplifier and the mixers to calibrate performance parameters of the low noise amplifier and the mixers;

controlling, by the calibration control unit, the bias regulation subunit, the amplitude regulation subunit, and the phase regulation subunit for the power amplifier or driver amplifier to calibrate performance parameters of the power amplifier or driver amplifier;

controlling, by the calibration control units, the DC offset cancellation subunits for the programmable gain amplifiers, the filters, and the operational amplifier to calibrate DC offsets of the programmable gain amplifiers, the filters, and the operational amplifier;

controlling, by the calibration control units, the bias regulation subunits, the amplitude regulation subunits, and the phase regulation subunits for the programmable gain amplifiers, the filters, and the operational amplifier to calibrate performance parameters of the programmable gain amplifiers, the filters, and the operational amplifier;

controlling, by the calibration control unit, the center frequency of a radio frequency filter to regulate and calibrate the center frequency of the transceiver;

controlling, by the calibration control unit, a bandwidth of an intermediate frequency filter to regulate and calibrate a channel bandwidth of the transceiver;

controlling, by the calibration control units, the amplitude regulation subunits and the phase regulation subunits for the frequency synthesizers to calibrate performance parameters of the frequency synthesizers;

step 4-A2: controlling, by the calibration control units, the calibration regulation units corresponding to the circuit modules to calibrate the circuit modules, comprising:

controlling, by the calibration control units, radio frequency input matching regulation subunits, local oscillator input matching regulation subunits, and intermediate frequency output impedance regulation subunits for radio frequency receiver front-end circuit modules, comprising the low noise amplifier and the down-mixer, to calibrate performance parameters of the radio frequency receiver front-end circuit modules;

controlling, by the calibration control units, radio frequency output matching regulation subunits, local oscillator input matching regulation subunits, and intermediate frequency input impedance regulation subunits for transmitter radio frequency front-end circuit modules, comprising the power amplifier and the up-mixer, to calibrate performance parameters of the transmitter radio frequency front-end circuit modules;

controlling, by the calibration control units, input impedance regulation subunits and output impedance regulation subunits for analog baseband circuit modules, comprising the programmable gain amplifiers and the filters, to calibrate performance parameters of the analog baseband circuit modules;

step 4-A3: controlling, by the calibration control units, the calibration regulation units corresponding to the receiving chain and transmitting chain in the frequency mixing transceiver to calibrate the receiving chain and transmitting chain in the frequency mixing transceiver, comprising:

controlling, by the calibration control units, input matching regulation subunits, local oscillator input matching regulation subunits, and intermediate frequency output impedance regulation subunits for the receiving chain in the frequency mixing transceiver to calibrate performance parameters of the receiving chain in the frequency mixing transceiver;

controlling, by the calibration control units, output matching regulation subunits, local oscillator input matching regulation subunits, and intermediate frequency input impedance regulation subunits for the transmitting chain in the frequency mixing transceiver to calibrate performance parameters of the transmitting chain in the frequency mixing transceiver; and controlling, by the calibration control units, the calibration regulation units to regulate structures, geometric scales, and working parameters of the circuit devices or circuit modules in the receiving chain and transmitting chain of each channel in the frequency mixing transceiver, and working parameters of input/output nodes, so as to achieve real-time calibration and performance optimization on the frequency mixing transceiver.

12. The calibration method for the radio frequency domain calibration system for radio frequency circuit units according to claim 10, wherein in step 4, regulating and calibrating the phase shifting transceiver comprises:

step 4-B1: controlling, by the calibration control units, the calibration regulation units corresponding to the circuit devices to calibrate the circuit devices, comprising:

controlling, by the calibration control units, the bias regulation subunit, the amplitude regulation subunit, and the phase regulation subunit for the low noise amplifier to calibrate performance parameters of the low noise amplifier;

controlling, by the calibration control unit, the bias regulation subunit, the amplitude regulation subunit, and the phase regulation subunit for the power amplifier or driver amplifier to calibrate performance parameters of the power amplifier or driver amplifier;

controlling, by the calibration control units, the bias regulation subunits and the phase regulation subunits for the phase shifters to calibrate performance parameters of the phase shifters;

controlling, by the calibration control units, the bias regulation subunits and the amplitude regulation subunits for the attenuators to calibrate performance parameters of the attenuators;

controlling, by the calibration control units, transmission line structures and geometric scales of the transmission line regulation subunits in the power synthesizer and the power distributor to calibrate performance parameters of the power synthesizer and the power distributor;

step 4-B2: controlling, by the calibration control units, the calibration regulation units corresponding to the circuit modules to calibrate the circuit modules, comprising:

controlling, by the calibration control units, input matching regulation subunits and output matching regulation subunits of the amplitude and phase control circuit modules, comprising the receiver phase shifter and the receiver attenuator, to calibrate performance parameters of the amplitude and phase control circuit modules;

controlling, by the calibration control units, input matching regulation subunits and output matching regulation subunits of the amplitude and phase control circuit modules, comprising the transmitter phase shifter and the transmitter attenuator, to calibrate performance parameters of the amplitude and phase control circuit modules;

step 4-B3: controlling, by the calibration control units, the calibration regulation units corresponding to the receiving chain and transmitting chain in the phase shifting transceiver to calibrate the receiving chain and transmitting chain in the phase shifting transceiver, comprising:

controlling, by the calibration control units, input matching regulation subunits and output matching regulation subunits of the receiving chain and transmitting chain in the phase shifting transceiver to calibrate performance parameters of the receiving chain and transmitting chain in the phase shifting transceiver; and controlling, by the calibration control units, the calibration regulation units to regulate structures, geometric scales, and working parameters of the circuit devices or circuit modules in the receiving chain and transmitting chain of each channel in the phase shifting transceiver, and working parameters of input/output nodes, so as to achieve real-time calibration and performance optimization on the phase shifting transceiver.

13. The calibration method for the radio frequency domain calibration system for radio frequency circuit units according to claim 10, wherein in step 4, regulating the reconfigurable transceiver or circuit module comprises:

step 4-C1: controlling, by the calibration control unit, the calibration regulation unit to regulate circuit structures, geometric scales, working parameters of the reconfigurable regulation circuit and reconfigurable circuit devices, working parameters of input/output nodes, frequencies, and bandwidths;

step 4-C2: controlling, by the calibration control unit, the calibration regulation unit to regulate working parameters of the reconfigurable regulation circuit and reconfigurable circuit modules, working parameters of input/output nodes, frequencies, and bandwidths;

step 4-C3: controlling, by the calibration control unit, the calibration regulation unit to regulate working parameters of the reconfigurable regulation circuit and the reconfigurable transceiver, working parameters of input/output nodes, frequencies, and bandwidths; and controlling, by the calibration control unit, the calibration regulation unit, so that the reconfigurable transceiver or circuit module works in a desired mode, frequency band, bandwidth, or protocol, and achieves real-time switching and performance optimization.

14. The calibration method for the radio frequency domain calibration system for radio frequency circuit units according to claim 10, wherein for the radio frequency domain calibration system with the feedback circuit unit, the following steps are further comprised:

step 5-R1: sampling, by the calibration observation receiver, signals of one or more input/output nodes of the radio frequency circuit unit;

step 5-R2: detecting and quantifying, by the signal detection unit, the signals received by the calibration observation receiver; and step 5-R3: controlling, by the calibration control unit, the calibration regulation unit according to the detection and quantification results to regulate and calibrate the radio frequency circuit unit in real time.

15. The calibration method for the radio frequency domain calibration system for radio frequency circuit units according to claim 14, wherein the radio frequency domain pre-distortion calibration comprises the following steps:

step 5-S1: sampling, by the calibration observation receiver, the following circuit units or nodes, comprising:

sampling signals of input/output nodes of one or more circuit devices in the transmitting chain;
sampling signals of input/output node signals of transmitting front-end circuit modules and analog baseband circuit modules in the transmitting chain; and
sampling signals of an input node of the transmitting antenna;
step 5-S2: detecting and quantifying, by the signal detection unit, the signals received by the calibration observation receiver; and
step 5-S3: controlling, by the calibration control unit, the calibration regulation unit according to the detection and quantification results to perform the radio frequency domain pre-distortion calibration on the circuit devices or modules in the transmitting chain.

16. The calibration method for the radio frequency domain calibration system for radio frequency circuit units according to claim 15, wherein after the radio frequency domain calibration, jointly calibrating the transceiver circuit system or circuit module in the radio frequency domain and the digital domain further comprises the following steps:
for the receiving chain of the transceiver circuit system:
step 5-T1: converting the signals calibrated in the radio frequency domain into digital signals by the ADC;
step 5-T2: driving, by the digital calibration control program in the MCU for digital domain calibration, the digital calibration algorithm program of the digital calibration algorithm circuit to calibrate output signals of the ADC;
for the transmitting chain of the transceiver circuit system:
step 5-P1: driving, by the digital calibration control program in the MCU for digital domain calibration, the digital calibration algorithm program of the digital calibration algorithm circuit to calibrate input digital signals of the DAC;
step 5-P2: converting the digital signals calibrated in the digital domain into analog signals by the DAC; and
step 6: iteratively calibrating the receiving chain and the transmitting chain.

17. The calibration method for the radio frequency domain calibration system for radio frequency circuit units according to claim 10, wherein in the radio frequency domain calibration system for radio frequency circuit units, a radio frequency transceiver circuit system or circuit module regulated and calibrated by the calibration unit comprises a single channel or multiple channels, has a frequency mixing structure, a phase shifting structure, or a combination of the two, and works in one of or a combination of communication, radar, navigation, tracking, imaging, measurement, and electronic countermeasure modes, and its working frequency covers radio frequency bands, microwave or millimeter wave frequency bands, terahertz frequency band, or a combination of different frequency bands above.

18. The calibration method for the radio frequency domain calibration system for radio frequency circuit units according to claim 17, wherein in the radio frequency domain calibration system for radio frequency circuit units, circuit devices or circuit modules regulated and calibrated by the calibration units in the radio frequency domain in the frequency mixing transceiver or circuit module comprise:
in a receiving chain of the frequency mixing transceiver, after an antenna receives signals, the circuit devices comprise a low noise amplifier, a down-mixer, a receiver frequency synthesizer, a receiver programmable gain amplifier, and a receiver filter in order of connection, wherein the receiver frequency synthesizer is connected to the down-mixer to provide local oscillator signals for the receiving chain; and
in a transmitting chain of the frequency mixing transceiver, before the antenna transmits signals, the circuit devices comprise a transmitter filter, a transmitter programmable gain amplifier, a transmitter frequency synthesizer, an up-mixer, and a power amplifier or driver amplifier in order of connection, wherein the transmitter frequency synthesizer is connected to the up-mixer to provide local oscillator signals for the transmitting chain;
wherein the calibration regulation units for the low noise amplifier, the mixers, and the power amplifier or driver amplifier each comprise a bias regulation subunit, an amplitude regulation subunit, and a phase regulation subunit;
the calibration regulation units for the programmable gain amplifiers, the filters, and the operational amplifier each comprise a bias regulation subunit, an amplitude regulation subunit, a phase regulation subunit, and a DC offset cancellation subunit; and
the calibration regulation units for the frequency synthesizers each comprise an amplitude regulation subunit and a phase regulation subunit.

19. The calibration method for the radio frequency domain calibration system for radio frequency circuit units according to claim 17, wherein in the radio frequency domain calibration system for radio frequency circuit units, circuit devices or circuit modules regulated and calibrated by the calibration units in the radio frequency domain in the phase shifting transceiver or circuit module comprise:
in a receiving chain of the phase shifting transceiver, after an antenna receives signals, the circuit devices regulated and calibrated by the calibration units comprise a low noise amplifier, a receiver phase shifter, a receiver attenuator, and a power synthesizer in order of connection; and
in a transmitting chain of the phase shifting transceiver, after a power distributor performs power distribution on input signals and before the antenna transmits signals, the circuit devices regulated and calibrated by the calibration units comprise a transmitter attenuator, a transmitter phase shifter, and a power amplifier or driver amplifier in order of connection;
wherein the calibration regulation units for the phase shifters each comprise a bias regulation subunit and a phase regulation subunit;
the calibration regulation units for the attenuators each comprise a bias regulation subunit and an amplitude regulation subunit; and
the calibration regulation units for the power synthesizer and the power distributor each comprise a transmission line regulation subunit.

20. The calibration method for the radio frequency domain calibration system for radio frequency circuit units according to claim 10, wherein the radio frequency domain calibration system further comprises a radio frequency domain and digital domain joint calibration circuit;
the radio frequency domain and digital domain joint calibration circuit comprises a calibration unit and circuit unit in the radio frequency domain, an MCU for digital domain calibration, an ADC/DAC, a digital calibration algorithm circuit, a data interface circuit, and a baseband circuit;
the digital calibration algorithm circuit is configured to implement a digital calibration algorithm program;

the digital calibration algorithm program comprises an orthogonal error correction algorithm, a DC offset correction algorithm, an IQ path mismatch correction algorithm, a local oscillator leakage correction algorithm, an image rejection correction algorithm, and a digital pre-distortion correction algorithm;

the MCU for digital domain calibration runs the digital calibration control program to control the digital calibration algorithm circuit, the data interface circuit, and the baseband circuit;

the data interface circuit is configured for information interaction between the digital calibration algorithm circuit and the baseband circuit; and the baseband circuit is configured to process digital baseband signals.

* * * * *